(12) United States Patent (10) Patent No.: US 9,342,148 B2
Koga (45) Date of Patent: May 17, 2016

(54) ELECTRONIC DEVICE FOR GENERATING VIBRATIONS IN RESPONSE TO TOUCH OPERATION

(71) Applicant: Panasonic Corporation, Osaka (JP)

(72) Inventor: Akira Koga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 216 days.

(21) Appl. No.: 13/772,719

(22) Filed: Feb. 21, 2013

(65) Prior Publication Data

US 2013/0222339 A1 Aug. 29, 2013

(30) Foreign Application Priority Data

Feb. 23, 2012 (JP) ................................. 2012-037106
Jan. 15, 2013 (JP) ................................. 2013-004367

(51) Int. Cl.
*G06F 3/01* (2006.01)

(52) U.S. Cl.
CPC .......... *G06F 3/016* (2013.01); *G06F 2203/014* (2013.01)

(58) Field of Classification Search
USPC ........................................ 345/156, 173, 174
See application file for complete search history.

(56) References Cited

U.S. PATENT DOCUMENTS

| | | | |
|---|---|---|---|
| 2001/0035854 A1* | 11/2001 | Rosenberg et al. | 345/156 |
| 2005/0156904 A1* | 7/2005 | Katayose | 345/173 |
| 2005/0174336 A1 | 8/2005 | Nakayama et al. | |
| 2005/0200611 A1 | 9/2005 | Goto et al. | |
| 2006/0238517 A1* | 10/2006 | King et al. | 345/173 |
| 2007/0002029 A1 | 1/2007 | Iso | |
| 2007/0035527 A1 | 2/2007 | Cheon et al. | |
| 2008/0296072 A1* | 12/2008 | Takashima | G06F 3/016 178/18.01 |
| 2009/0085886 A1* | 4/2009 | Huang | G06F 3/04886 345/173 |
| 2009/0227295 A1 | 9/2009 | Kim | |
| 2009/0262091 A1* | 10/2009 | Ikeda et al. | 345/173 |
| 2010/0164959 A1* | 7/2010 | Brown et al. | 345/473 |
| 2010/0188327 A1 | 7/2010 | Frid et al. | |
| 2010/0188363 A1 | 7/2010 | Ikeda et al. | |
| 2011/0061023 A1* | 3/2011 | Kim | 715/810 |
| 2011/0090255 A1 | 4/2011 | Wilson et al. | |
| 2011/0163978 A1 | 7/2011 | Park et al. | |
| 2011/0201387 A1* | 8/2011 | Paek et al. | 455/566 |
| 2011/0216025 A1* | 9/2011 | Kurita | G06F 3/041 345/173 |
| 2011/0279380 A1* | 11/2011 | Weber et al. | 345/173 |
| 2013/0044075 A1* | 2/2013 | Utsugi et al. | 345/174 |

FOREIGN PATENT DOCUMENTS

| | | |
|---|---|---|
| JP | 2002-157086 A | 5/2002 |
| JP | 2005-004690 A | 1/2005 |
| JP | 2005-222326 A | 8/2005 |
| JP | 2009-217816 A | 9/2009 |
| JP | 2010-250002 A | 11/2010 |
| JP | 2011-141868 A | 7/2011 |

* cited by examiner

*Primary Examiner* — Alexander Eisen
*Assistant Examiner* — Kebede Teshome
(74) *Attorney, Agent, or Firm* — Renner, Otto, Boisselle & Sklar, LLP

(57) ABSTRACT

The electronic device 10 includes: a display panel 18 for displaying information in a display area 12; a touch panel 11 to be touched by a user; a vibrating section 13 for vibrating the touch panel 11; and a vibration control section 33 for controlling the vibration of the vibrating section 13. While the user keeps touching the touch panel 11, if the touched position is moved between the inside and the outside of the display area 12, the vibration control section 33 changes the vibration.

7 Claims, 18 Drawing Sheets

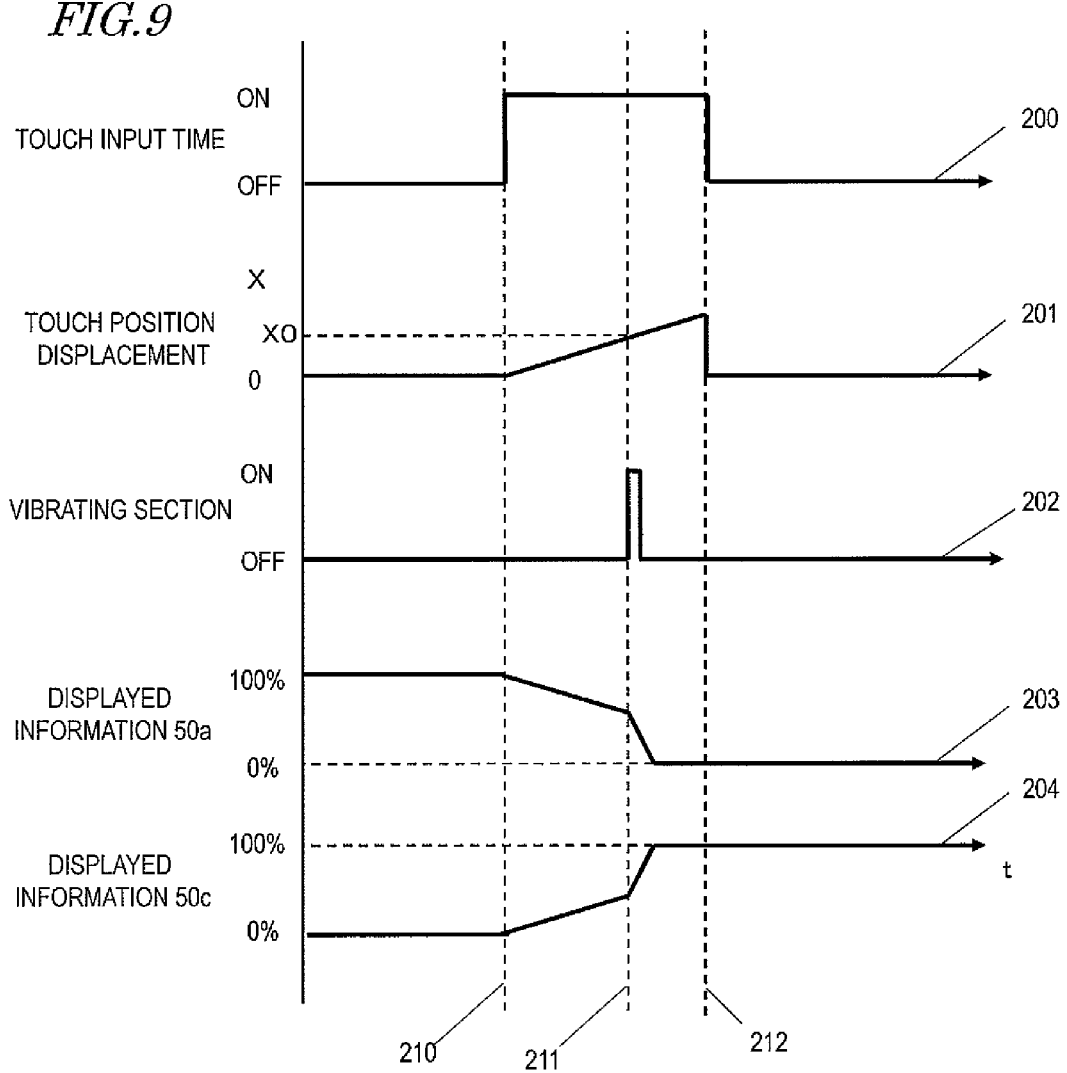

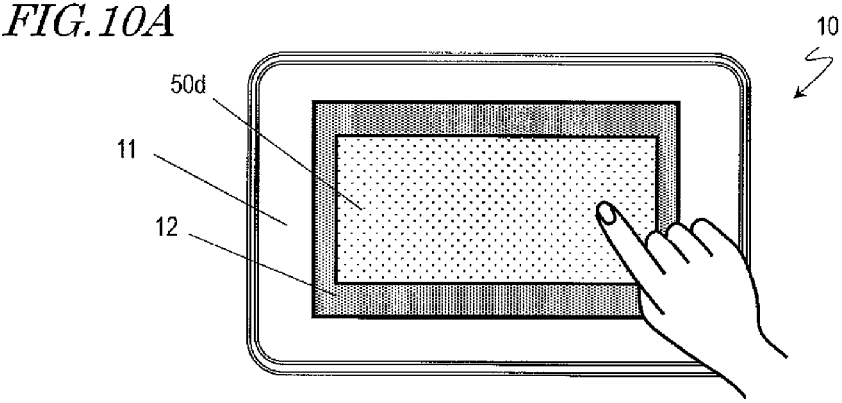
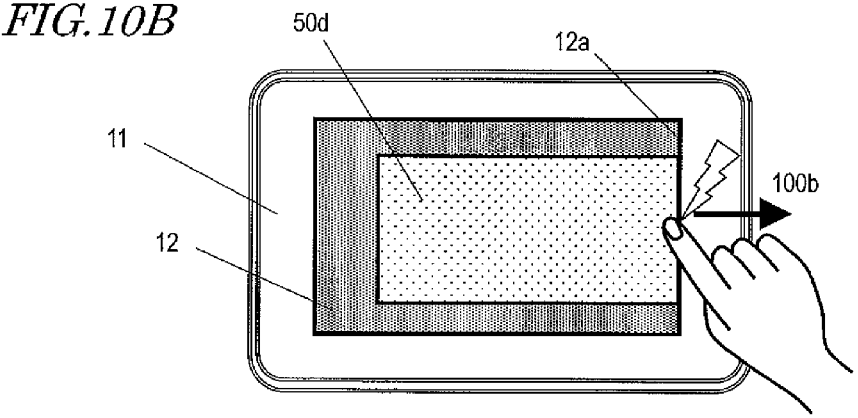
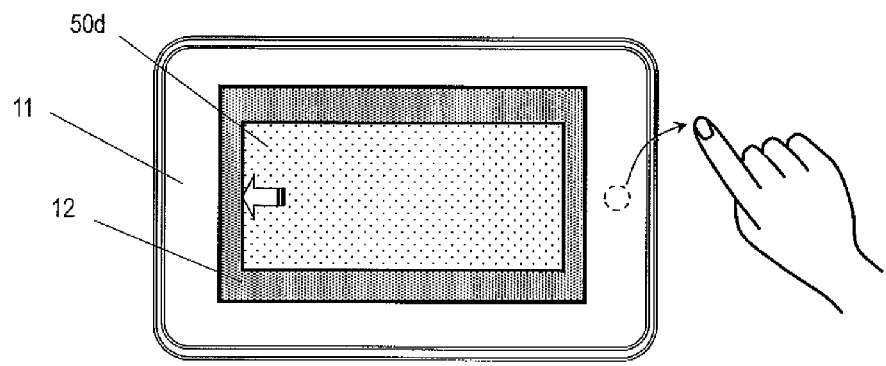

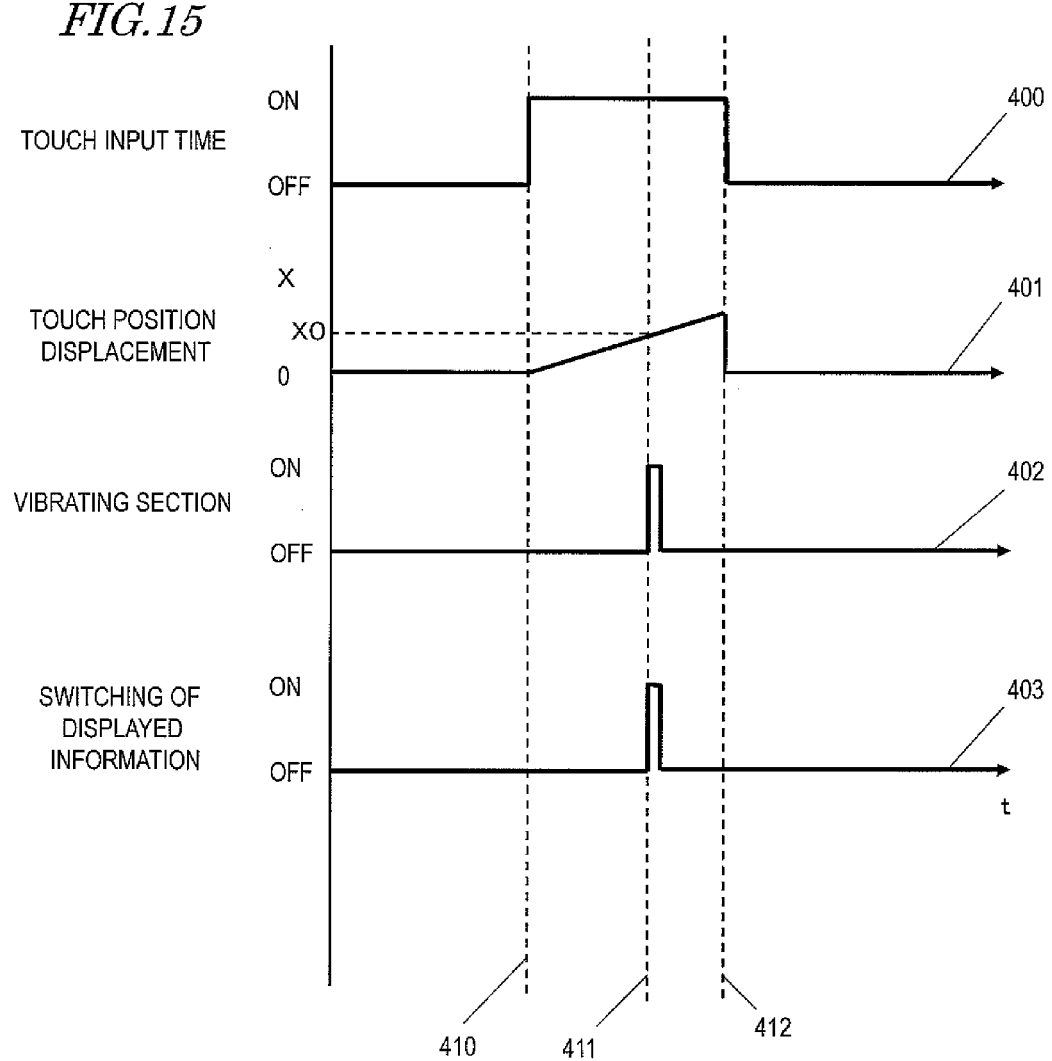

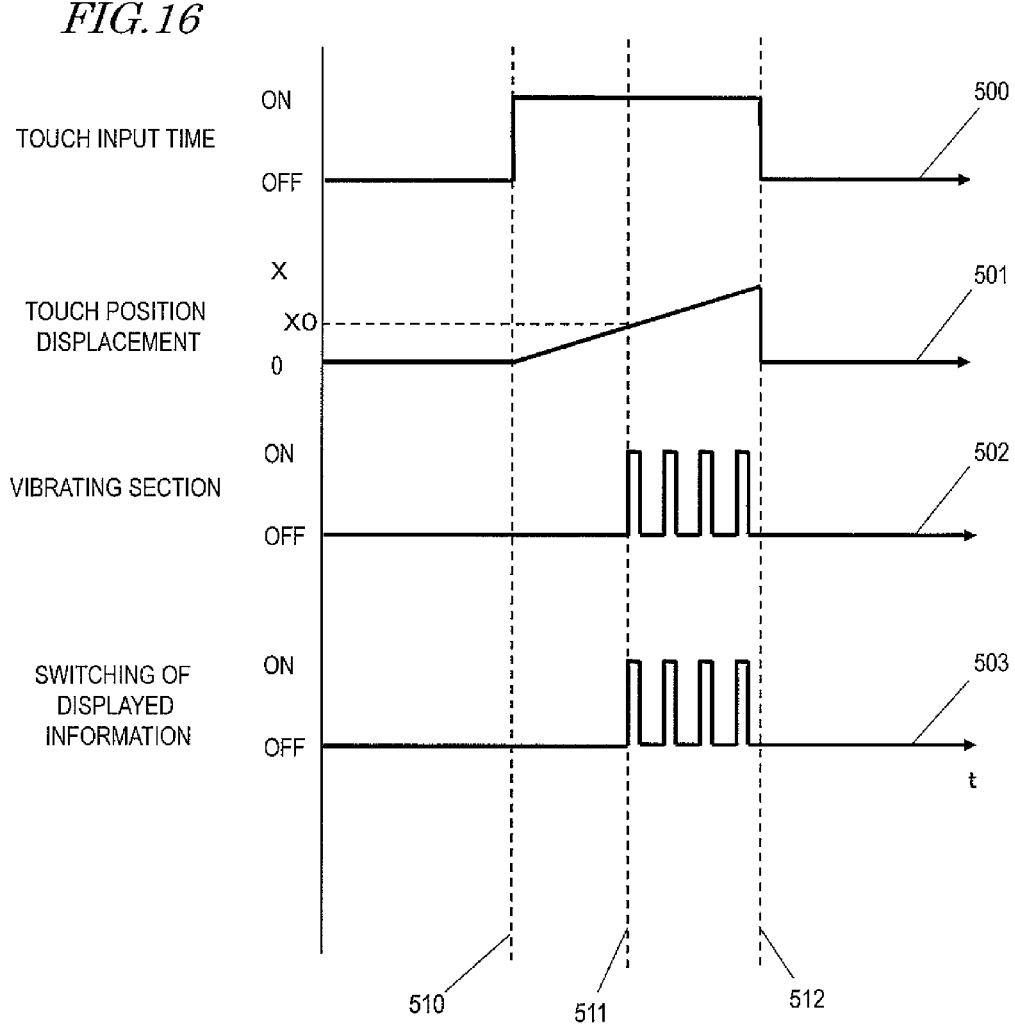

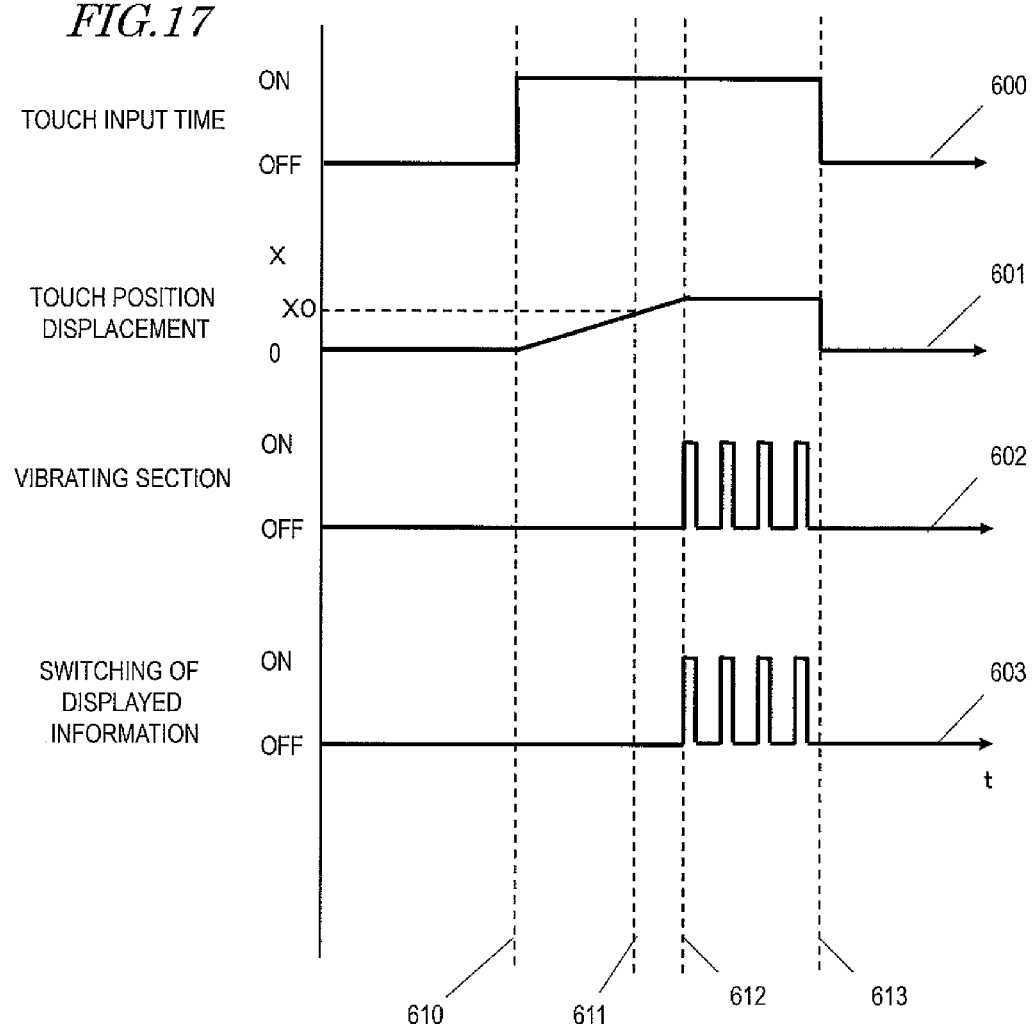

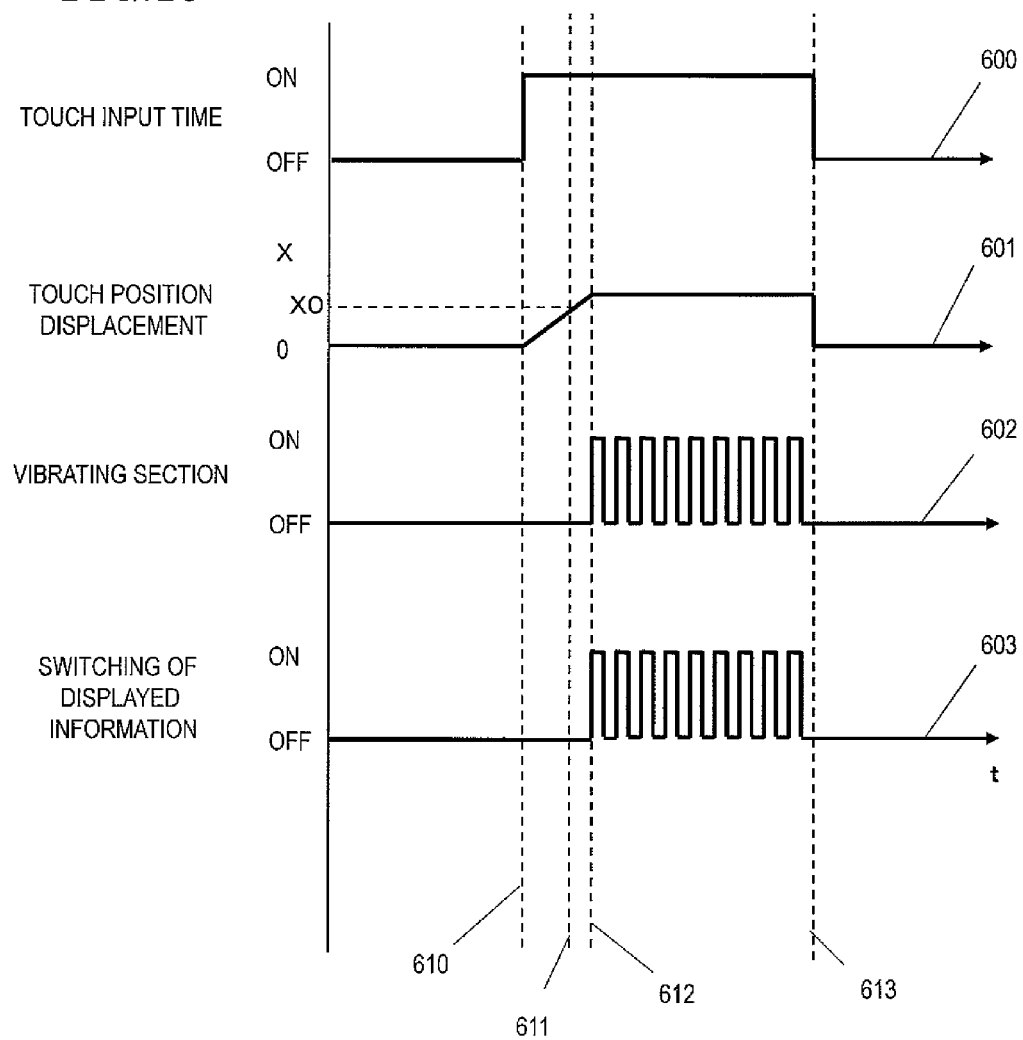

ELECTRONIC DEVICE FOR GENERATING VIBRATIONS IN RESPONSE TO TOUCH OPERATION

BACKGROUND

1. Technical Field

The present disclosure relates to an electronic device which generates vibrations in response to a touch operation by a user.

2. Description of the Related Art

Electronic devices having a touch panel disposed on a display screen have been put to practical use. In touch panel operations, however, it is difficult for the user to appreciate a feel of the input operation, and thus unintended touch inputs may occur. Moreover, when an operation is made by touching on a display screen, the touching finger may hide the display screen, thus making it difficult to confirm the displayed information.

With a view to improving the controllability of touch inputs, techniques are known for giving a tactile sensation to the user by vibrating the touch panel. By applying a voltage to a piezoelectric element which is secured to a touch panel, a vibration is generated on the touch panel, thus allowing the user to experience a tactile sensation (see, for example, Japanese Laid-Open Patent Publication No. 2005-222326).

Japanese Laid-Open Patent Publication No. 2005-4690 discloses a device in which a sensor section is provided outside the display screen, and as a finger touching the sensor section is moved up or down, a menu which is displayed on the screen is scrolled for selection. This prevents the displayed menu from being hidden by the touching finger.

SUMMARY

The present disclosure provides an electronic device which achieves realistic and diverse operation feels by presenting tactile sensations during touch operations over a region which is broader than the display area. Moreover, the present disclosure provides an electronic device with which a user can easily recognize that an identical position on the touch panel has been touched in succession.

An electronic device according to one embodiment of the present disclosure includes a display section for displaying information in a display area, a panel to be touched by a user, a vibrating section for vibrating the panel, and a vibration control section for controlling the vibration of the vibrating section. While the user keeps touching the panel, if the position of touching moves between the inside and the outside of the display area, the vibration control section changes the vibration.

Moreover, an electronic device according to one embodiment of the present disclosure includes a panel to be touched by a user, a vibrating section for vibrating the panel, and a vibration control section for controlling the vibration of the vibrating section. While the user keeps touching the panel, if the position of touching moves between the inside and the outside of a touch position detection area of the panel, the vibration control section changes the vibration.

Moreover, an electronic device according to one embodiment of the present disclosure includes a display section for displaying information, a panel to be touched by a user, a vibrating section for vibrating the panel, and a vibration control section for controlling the vibration of the vibrating section. When the user touches a first area of the panel, the vibration control section causes the vibrating section to generate a first vibration. After the touch on the first area ceases, if the user again touches the first area within a predetermined time, the vibration control section causes the vibrating section to generate a second vibration different from the first vibration.

In one embodiment of the present disclosure, when a touch position is moved between the inside and the outside of the display area, vibration of the touch panel is changed. This realizes a realistic feel of operation. In one embodiment of the present disclosure, when a touch position is moved between the inside and the outside of a touch position detection area, vibration of the touch panel is changed. This realizes a realistic feel of operation. In one embodiment of the present disclosure, by ensuring that different vibrations are generated when a user touches the same place on the touch panel in succession, the user can surely recognize multiple inputs having been made.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 9 is a diagram showing a time chart in a touch operation according to an embodiment.

FIG. 10A is a diagram showing a state of operation in a touch operation according to an embodiment.

FIG. 10B is a diagram showing a state of operation in a touch operation according to an embodiment.

FIG. 10C is a diagram showing a state of operation in a touch operation according to an embodiment.

FIG. 15 is a diagram showing a time chart in a touch operation according to an embodiment.

FIG. 16 is a diagram showing a time chart in a touch operation according to an embodiment.

FIG. 17 is a diagram showing a time chart in a touch operation according to an embodiment.

FIG. 18 is a diagram showing a time chart in a touch operation according to an embodiment.

DETAILED DESCRIPTION

Figure 1:
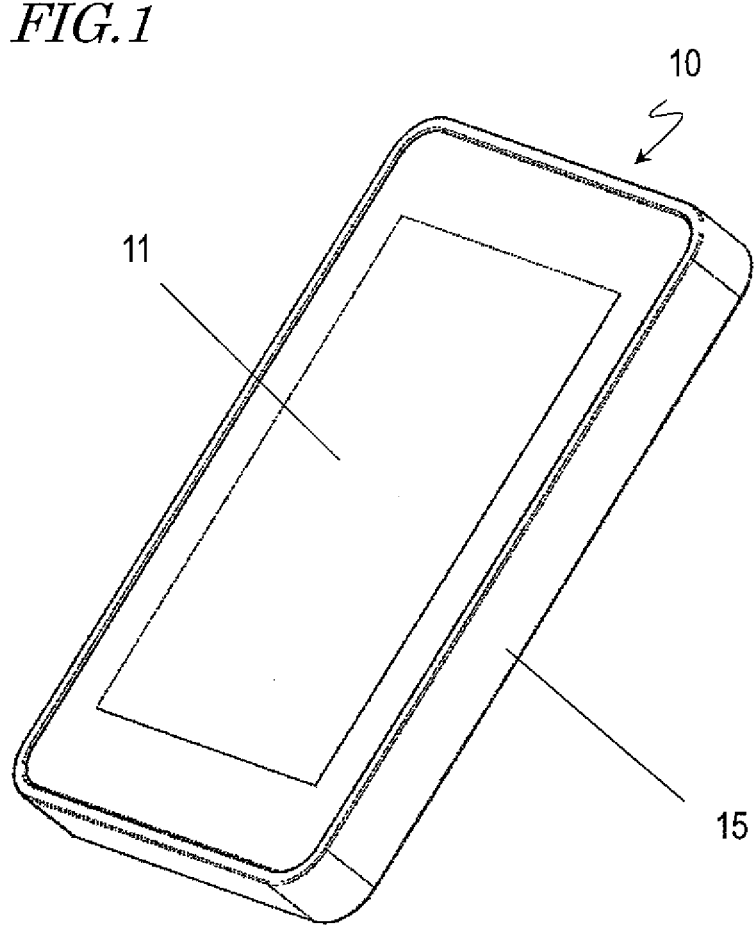
FIG. 1 is an external perspective view showing an electronic device according to an embodiment.

Embodiments will now be described in detail, referring to the drawings. Note however that unnecessarily detailed descriptions may be omitted. For example, detailed descriptions on what is well known in the art or redundant descriptions on what is substantially the same constitution may be omitted. This is to avoid lengthy description, and facilitate the understanding of those skilled in the art.

The accompanying drawings and the following description, which are provided by the present inventors so that those skilled in the art can sufficiently understand the present disclosure, are not intended to limit the scope of claims.

Embodiment 1

In the electronic device which is disclosed in Japanese Laid-Open Patent Publication No. 2005-222326, its touch operation is limited within the display screen. In the electronic device which is disclosed in Japanese Laid-Open Patent Publication No. 2005-4690, touch operation outside the display screen is possible, but this touch operation is an operation which occurs only outside of the display screen, independently of any touch operation within the display screen. Moreover, in the electronic device disclosed in Japanese Laid-Open Patent Publication No. 2005-4690, no vibration is generated in response to a touch operation. Thus, in the conventional electronic devices, no vibration is presented to the user when a touch position is moved between the inside and the outside of a display screen.

An electronic device according to an embodiment of the present disclosure presents a tactile sensation to a user in the form of vibration, when a touch position is moved between the inside and the outside of a display screen. Hereinafter, the embodiment will be described with reference to the drawings.

<Overall Structure of the Electronic Device>

With reference to FIG. 1, FIG. 2, FIG. 3, FIG. 4, FIG. 5, and FIG. 6, the overall structure of an electronic device 10 according to the present embodiment will be described.

Figure 2:
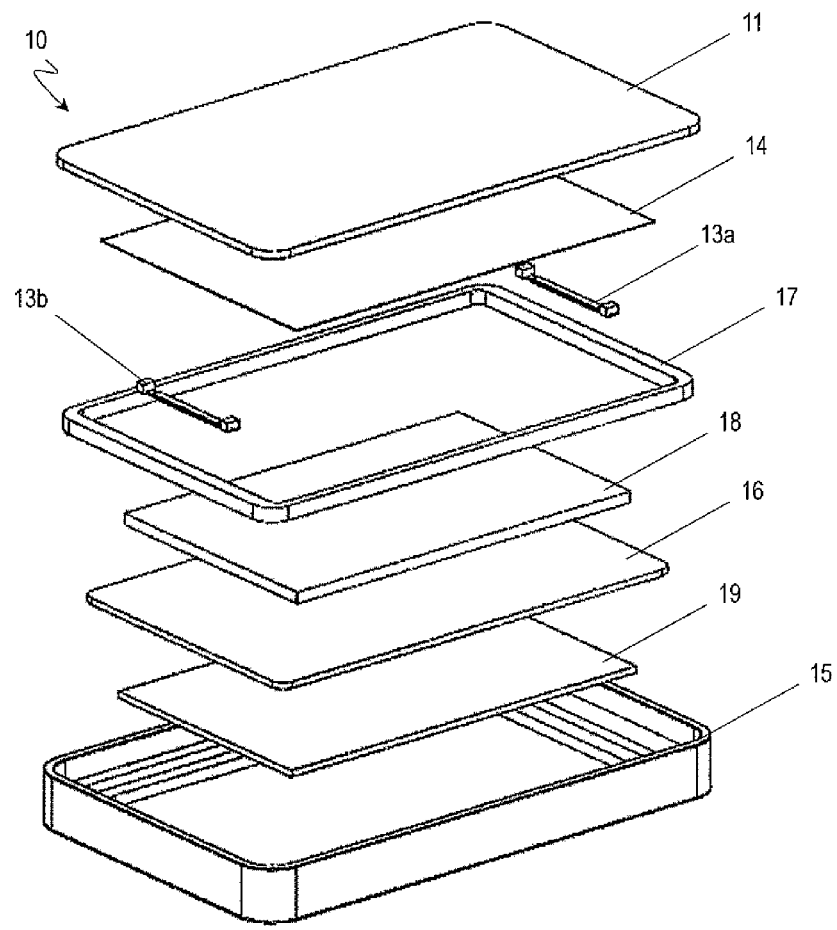
FIG. 2 is an exploded parts view showing an electronic device according to an embodiment.
Figure 3:
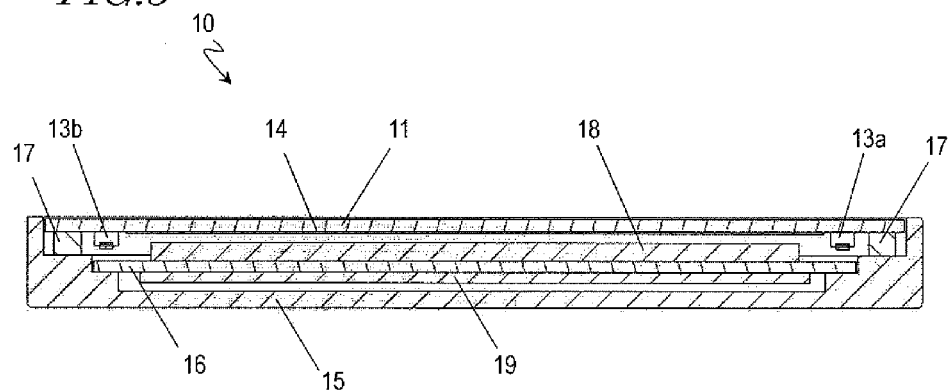
FIG. 3 is a cross-sectional view showing an electronic device according to an embodiment.
Figure 4:
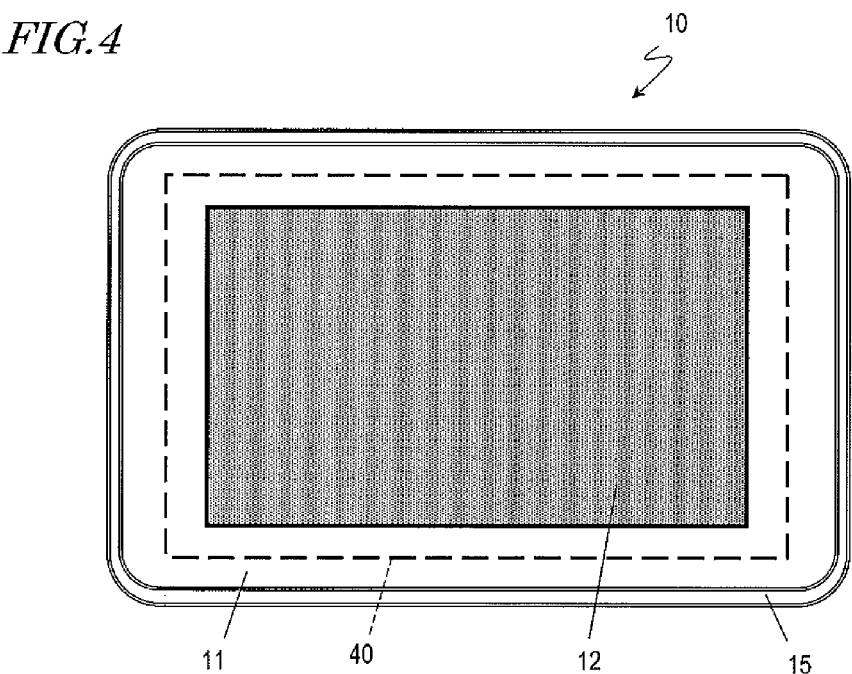
FIG. 4 is a front view showing an electronic device according to an embodiment.
Figure 5:
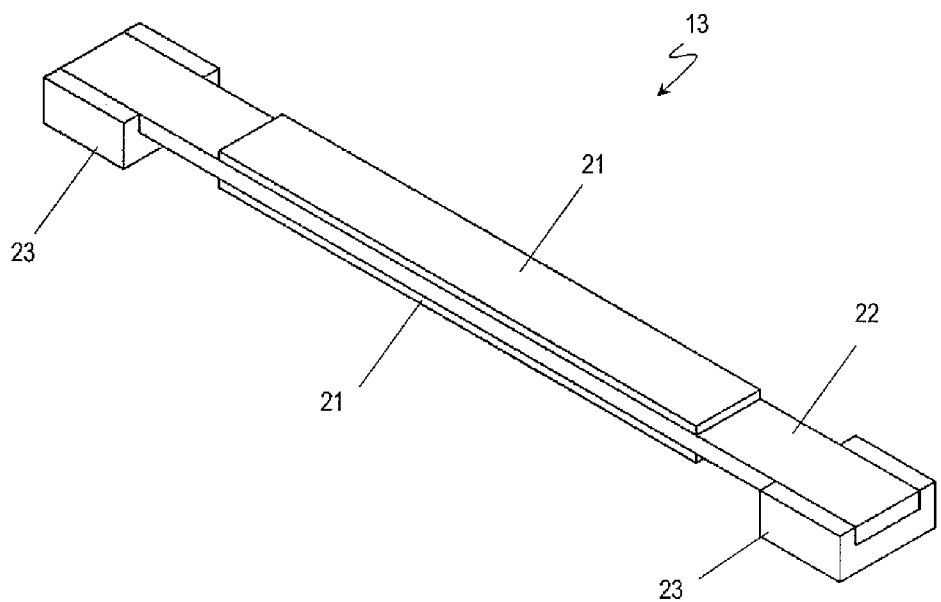
FIG. 5 is an external perspective view showing a vibrating section according to an embodiment.
Figure 6:
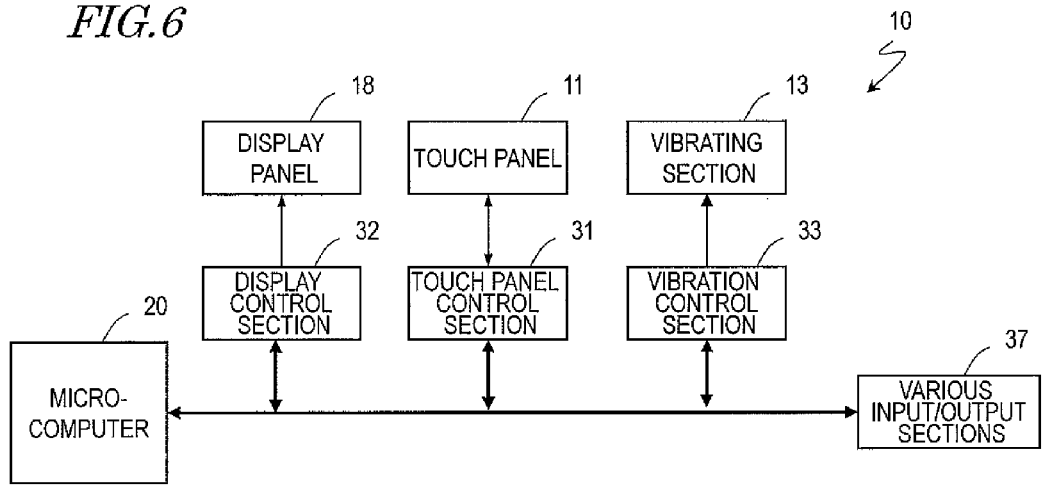
FIG. 6 is a block diagram showing the constitution of an electronic device according to an embodiment.

FIG. 1 is a perspective view showing the external appearance of the electronic device 10. FIG. 2 is an exploded parts view of the electronic device 10. FIG. 3 is a cross-sectional view of the electronic device 10, while FIG. 4 is a front view of the electronic device 10. FIG. 5 is an external perspective view of a vibrating section 13. FIG. 6 is a block diagram showing the constitution of the electronic device 10.

As shown in FIGS. 1 and 2, the electronic device 10 includes a touch panel 11, a touch panel electrode 14, the vibrating section 13 (13a, 13b), a spacer 17, a display panel 18, a fixture 16, a substrate 19, and a lower cover 15. The touch panel 11 is disposed so as to cover the display surface side of the display panel 18.

As shown in FIG. 3, a touch panel electrode 14 is attached on the touch panel 11. The touch panel electrode 14 is made of a transparent electrically conductive material such as ITO (Indium Tin Oxide). By detecting a change in the electrostatic capacity of the touch panel electrode 14 associated with a touch operation by the user, the touch panel 11 detects a touch position. On the lower side of the touch panel 11, the vibrating section 13 (13a, 13b) is attached. The vibrating section 13 (13a, 13b) vibrates the touch panel 11. The display panel 18 and the substrate 19 are held by the fixture 16, the fixture 16 being attached to the lower cover 15 with a screw or the like. The touch panel 11 is attached to the lower cover 15 via the spacer 17. The spacer 17 may be a shock-absorbing member such as silicone rubber or urethane rubber, for example. The spacer 17 is secured to the touch panel 11 and the lower cover 15 by using an adhesive, a double-sided tape, or the like.

As shown in FIG. 4, a display area 12 is a region in which visual information which is displayed by the display panel 18 can be visually recognized. An operable region (touch-position detectable area) 40 of the touch panel 11 is a region in which touch operation is possible. Since the operable region 40 has a larger geometric area than does the display area 12, it is possible to detect the user's touch on the touch panel 11 in a broader range than the display area 12.

As shown in FIG. 5, the vibrating section 13 includes piezoelectric elements 21, a shim plate 22, and bases 23. The piezoelectric elements 21 are attached on the front side and the rear side of the shim plate 22, and the opposite ends of the shim plate 22 are attached to the bases 23. The bases 23 are attached to the touch panel 11.

Each piezoelectric element 21 is a piezoelectric ceramic of lead zirconate titanate or the like, or a piezoelectric single crystal of lithium niobate or the like. The piezoelectric elements 21 expand or contract with voltage application. As one of the piezoelectric elements 21 attached on the opposite sides of the shim plate 22 expands while the other contracts, the shim plate 22 generates flexural vibration. The vibration frequency is about 100 to 400 Hz, for example.

The shim plate 22 is a spring member of phosphor bronze, etc. The vibration of the shim plate 22 vibrates the touch panel 11 via the bases 23, and the user operating the touch panel 11 can feel the vibration of the touch panel 11. The bases 23 are a metal such as aluminum or brass, or a plastic such as PET or PP.

Note that while the piezoelectric elements 21 are attached to the shim plate 22 in the present embodiment, the piezoelectric elements 21 may be attached directly to the touch panel 11. Alternatively, the piezoelectric elements 21 may be attached directly to any of the members of the electronic device 10, e.g., the display panel 18 or the lower cover 15.

Alternatively, a thin-film transparent piezoelectric member may be formed on the touch panel 11 by a method such as sputtering, and used as the vibrating section 13. Where a cover member, or the like, is present on the touch panel 11, the piezoelectric elements 21 may be attached to the cover member. Note that where a cover member is present on the touch panel 11, the touch panel 11 and the cover member are collectively referred to as a panel member for detecting a touch position. A vibration motor may be used as the vibrating section 13.

As shown in FIG. 6, the electronic device 10 includes a display control section 32 for controlling the displaying of the display panel 18, a touch panel control section 31 for controlling the touch panel 11, and a vibration control section 33 for controlling the vibration of the vibrating section 13. The electronic device 10 also includes a microcomputer 20 for performing various types of control and determination and various input/output sections 37.

<Description of Each Component>

The display panel 18 displays characters, numbers, icons, keyboards, etc., used for accepting inputs from the user. When a keyboard is displayed on the display panel 18, the user can make a character input, etc., by performing a touch operation at an arbitrary position on the keyboard. The display panel 18 may be a known display device of, for example, a liquid crystal type, an organic EL type, an electronic paper type, or a plasma type, etc.

The display control section 32 controls the content displayed on the display panel 18 based on the control signal generated by the microcomputer 20.

The touch panel 11 can detect the touch position of the user. Information on the touch position of the user is sent to the microcomputer 20 via the touch panel control section 31. The touch panel 11 may be a touch panel of, for example, an electrostatic type, a resistive type, an optical type, an ultrasonic type, an electromagnetic type, etc.

While the touch panel 11 and the display panel 18 are separate component elements in this example, the touch panel 11 and the display panel 18 may be formed as an integral member. For example, an in-cell type touch panel may be employed where the touch panel function is integrated inside a liquid crystal panel, or an on-cell type touch panel may be employed where the touch panel function is integrated on the surface of a liquid crystal panel. In this case, too, the panel is to be formed so that the operable region 40 has a larger geometric area than that of the display area 12.

The vibrating section 13 vibrates the touch panel 11. The vibration control section 33 controls the vibration pattern of the vibrating section 13.

Figure 7:
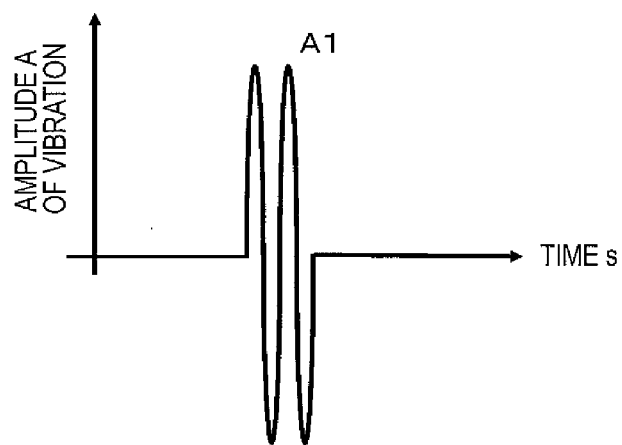
FIG. 7 is a diagram showing an example of a vibration pattern of the vibrating section according to an embodiment.

FIG. 7 is a schematic illustration showing an example of a vibration pattern. In response to an instruction from the microcomputer 20, the vibration control section 33 applies a voltage having a waveform shown in FIG. 7 to the vibrating section 13 to vibrate the touch panel 11, thereby giving the user a vibration A1. The voltage for generating the vibration A1 is a sinusoidal wave of 150 Hz, 33 Vrms, 2 cycles, for example. The amplitude on the touch panel 11 in this case is about 5 μm. Note that by setting the frequency and the voltage so that the vibration amplitude on the touch panel 11 is about 5 to 50 μm, it is possible to present a tactile sensation (vibration) that feels comfortable on a finger of a person.

Next, touch operation examples will be described. In the electronic device 10 according to an embodiment, if the microcomputer 20 detects that the touched position is moved between the inside and the outside of the display area 12 while the user keeps touching the touch panel 11, the vibration control section 33 changes the vibration. Moreover, when the touch position is moved between the inside and the outside of the display area 12, the display control section 32 changes the content displayed on the display panel 18. By changing the vibration of the touch panel 11 as the touch position is moved between the inside and the outside of the display area 12, a realistic feel of operation which is adapted to that operation can be provided to the user. The method of changing the vibration of the touch panel 11 may be making a transition between absence of vibration and presence of vibration, or transitioning from one vibration to another vibration. For example, from a given vibration, the amplitude and/or frequency may be changed, or the cycle with which vibrations are generated may be changed.

Touch Operation Example 1

Figure 8A:
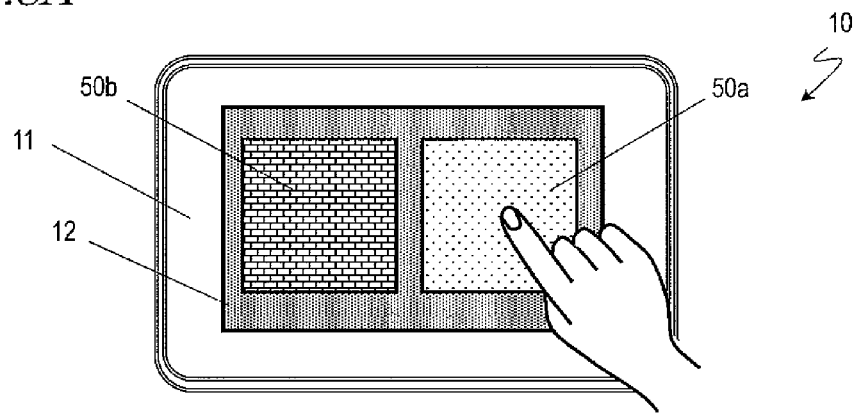
FIG. 8A is a diagram showing a state of operation in a touch operation according to an embodiment.
Figure 8B:
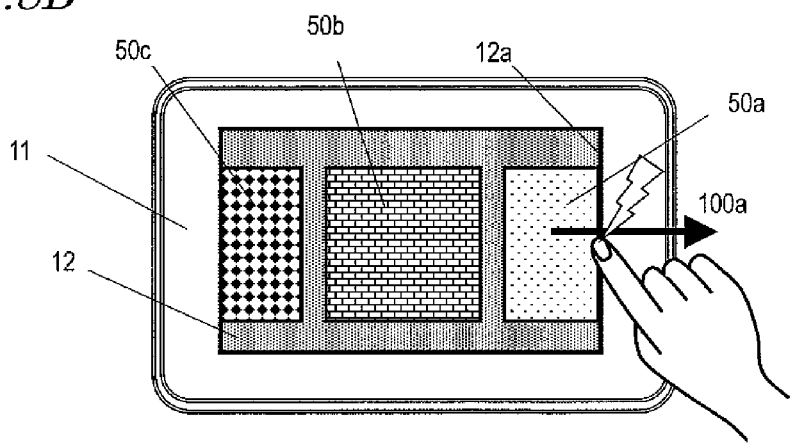
FIG. 8B is a diagram showing a state of operation in a touch operation according to an embodiment.
Figure 8C:
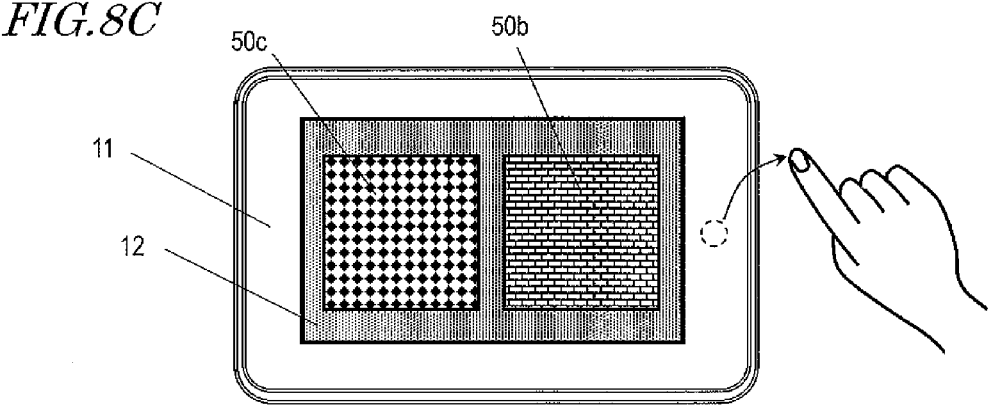
FIG. 8C is a diagram showing a state of operation in a touch operation according to an embodiment.

With reference to FIG. 8A through FIG. 9, an operation under Touch Operation Example 1 will be described. FIGS. 8A to 8C are diagrams showing states of operation under Touch Operation Example 1. FIG. 9 is a time chart of Touch Operation Example 1, showing a relationship between the touch input time and touch position displacement and the timing of driving the vibrating section 13, displayed information 50a, and displayed information 50c.

FIG. 8A illustrates displayed information 50a and 50b being displayed in the display area 12, where the user is touching on the displayed information 50a with a finger. FIG. 8B illustrates the user as sliding the displayed information 50a, with the finger, in the direction of an arrow 100a from the inside of the display area 12 toward a boundary 12a between the inside and the outside of the display area 12. At this time, the pieces of displayed information 50a and 50b move in the direction of the arrow 100a with the slide of the finger, and also displayed information 50c begins to appear while moving in the direction of the arrow 100a. FIG. 8C illustrates a state where the pieces of displayed information 50a, 50b, and 50c have finished moving and the user has lifted off the finger, the displayed information 50b and 50c now being displayed in the display area 12.

FIG. 9, an operation timing diagram 200 represents touch input time, where ON indicates any time when the touch panel 11 is touched by the user and OFF indicates any time when the touch panel 11 is not touched by the user. An operation timing diagram 201 represents touch position displacement, where a base point (0) defines a place at which the user first touches the touch panel 11 as shown in FIG. 8A; X defines a distance traveled in the direction of the arrow 100a; and X0 defines a position at which the user's finger meets the boundary 12a of the display area 12. An operation timing diagram 202 of the vibrating section 13 indicates whether the vibrating section 13 is vibrating to cause vibration of the touch panel 11 or not. An operation timing diagram 203 of the displayed information 50a indicates a proportion which the displayed information 50a accounts for, where the state shown in FIG. 8A corresponds to 100% and the state shown in FIG. 8C corresponds to 0%. An operation timing diagram 204 of the displayed information 50c indicates a proportion which the displayed information 50c accounts for, where the state shown in FIG. 5A corresponds to 0% and the state shown in FIG. 8C corresponds to 100%.

In FIGS. 5A to 5C, a touch operation according to the present embodiment results in the following operation when a user touches the touch panel 11 with a finger.

At time 210, the user touches the touch panel 11. Until time 211, as the user moves the finger with an essentially constant velocity in the direction of the arrow 100a, the geometric area in which the displayed information 50a is displayed decreases relative to the display area 12, but the geometric area in which the displayed information 50c is displayed increases. Note that the state of time 211 corresponds to the state shown in FIG. 8B.

Now, as a result of the user continuously moving the finger in the direction of the arrow 100a, if the boundary 12a of the display area 12 is exceeded, the vibrating section 13 generates a pulsed vibration as shown in FIG. 7, this vibration being transmitted to the user's finger via the touch panel 11. Since the operable region 40 of the touch panel 11 is broader than the display area 12, it is also capable of detecting a touch operation outside the display area 12. Moreover, successive moves of the touch position between the inside and the outside of the display area 12 can also be detected. At time 211, page-forwarding of the displayed information 50a, 50b, and 50c is automatically executed. At time 212, as shown in FIG. 8C, the user's finger is lifted off the touch panel 11, and the displayed information 50b and 50c is automatically displayed in full screen.

In the above operation, as the touch panel 11 is vibrated, the user is able to clearly confirm page-forwarding of displayed information.

Touch Operation Example 2

Figure 11:
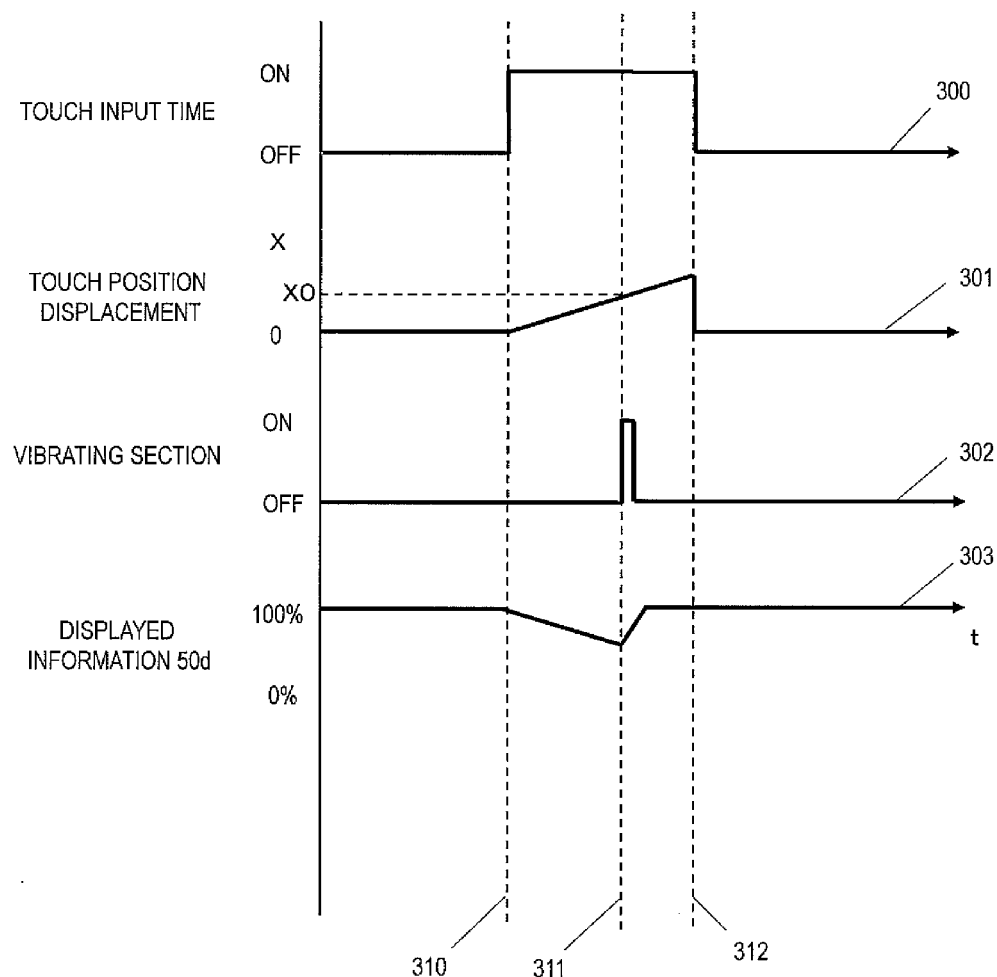
FIG. 11 is a diagram showing a time chart in a touch operation according to an embodiment.

With reference to FIG. 10A through FIG. 11, an operation under Touch Operation Example 1 will be described. FIGS. 10A to 10C are diagrams showing states of operation under Touch Operation Example 2. FIG. 11 is a time chart of Touch Operation Example 2, showing a relationship between the touch input time and touch position displacement and the timing of driving the vibrating section 13 and the displayed information 50d. The display control section 32 moves the displayed position of the information 50d in accordance with a move of the touch position, such that the displayed position of the information 50d moves in different directions in the respective periods before and after the touch position exceeds the boundary 12a between the inside and the outside of the display area 12.

FIG. 10A illustrates displayed information 50d being displayed in the display area 12, where the user is touching on the displayed information 50d with a finger. FIG. 10B illustrates the user as sliding the displayed information 50d, with the finger, in the direction of an arrow 100b from the inside of the display area 12 toward the boundary 12a of the display area 12. At this time, the displayed information 50d moves in the direction of the arrow 100b with the slide of the finger. There is no new displayed information to the left of the displayed information 50d, thus marking a so-called last page; therefore, the displayed information 50d is not supposed to disappear by moving further in the right direction of the display area 12. FIG. 10C shows the displayed information 50d moving back in the opposite direction of the arrow 100b, thus returning to the center of the display area 12.

In FIG. 11, an operation timing diagram 300 represents touch input time, where ON indicates any time when the touch panel 11 is touched by the user and OFF indicates any time when the touch panel 11 is not touched by the user. An operation timing diagram 301 represents touch position displacement, where a base point (0) defines a place at which the user first touches the touch panel 11 as shown in FIG. 10A; X defines a distance traveled in the direction of the arrow 100b; and X0 defines a position at which the user's finger meets the boundary 12a of the display area 12. An operation timing diagram 302 of the vibrating section 13 indicates whether the vibrating section 13 is vibrating to cause vibration of the touch panel 11 or not. An operation timing diagram 303 of the displayed information 50d indicates proportion which the displayed information 50d accounts for, where the state shown in FIG. 10A corresponds to 100%.

In FIGS. 10A to 10C, a touch operation according to the present embodiment results in the following operation when a user touches the touch panel 11 with a finger.

At time 310, the user touches the touch panel 11. Until time 311, as the user moves the finger with an essentially constant velocity in the direction of the arrow 100b, the geometric area in which the displayed information 50d is displayed decreases relative to the display area 12. Note that the state of time 311 corresponds to the state shown in FIG. 10B. Now, as a result of the user continuously moving the finger in the direction of the arrow 100b, if the boundary 12a of the display area 12 is exceeded, the vibrating section 13 generates a pulsed vibration as shown in FIG. 7, this vibration being transmitted to the user's finger via the touch panel 11. At time 311, move of the displayed information 50d is automatically canceled so that the displayed information 50d moves to the center of the display area 12. At time 312, as shown in FIG. 10C, the displayed information 50d is displayed in full screen across the display area 12.

In the above operation, as the touch panel 11 is vibrated, the user is able to clearly confirm that the displayed information corresponds to the last page.

Touch Operation Example 3

Figure 12A:
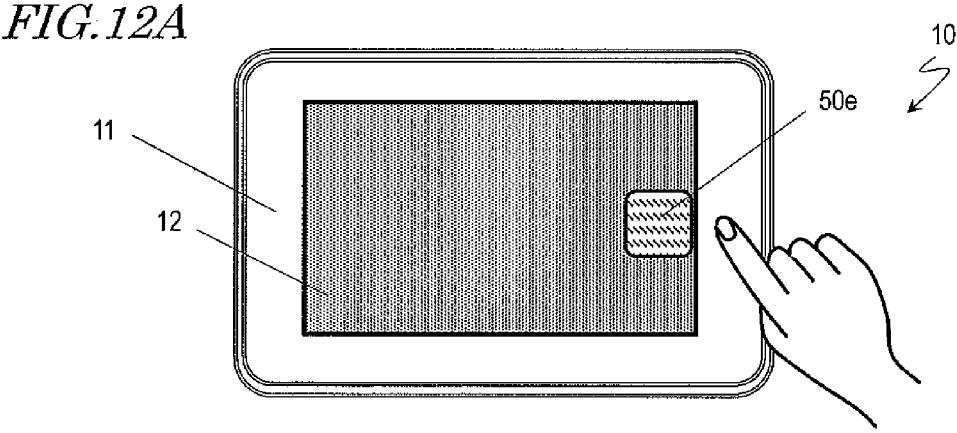
FIG. 12A is a diagram showing a state of operation in a touch operation according to an embodiment.
Figure 12B:
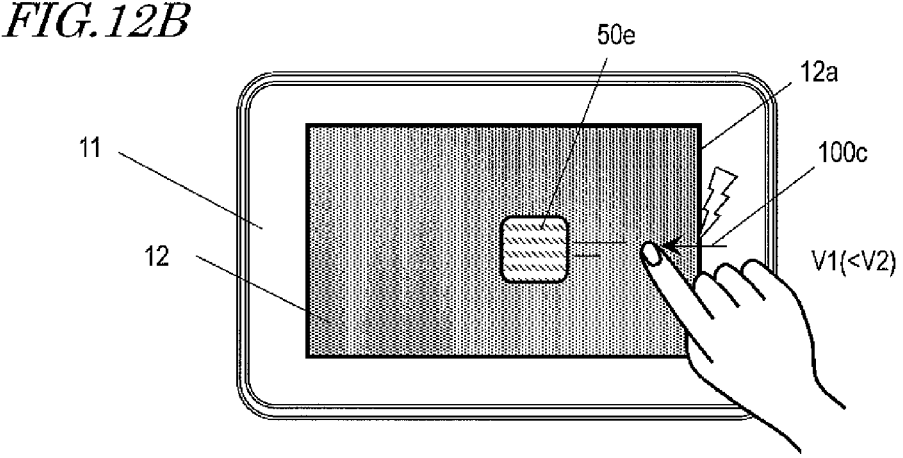
FIG. 12B is a diagram showing a state of operation in a touch operation according to an embodiment.
Figure 12C:
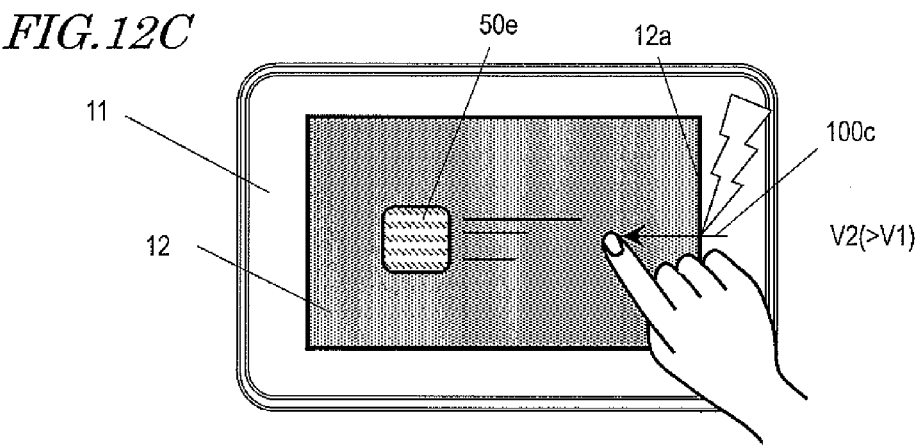
FIG. 12C is a diagram showing a state of operation in a touch operation according to an embodiment.
Figure 13A:
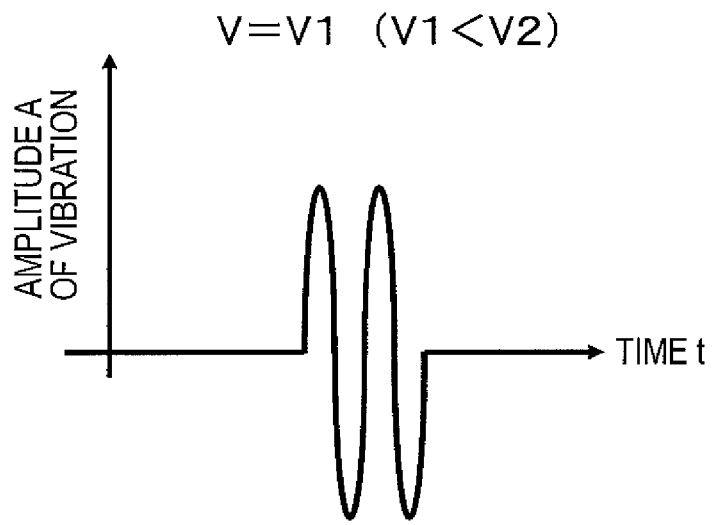
FIG. 13A is a diagram showing an example of a vibration pattern of the vibrating section in a touch operation according to an embodiment.
Figure 13B:
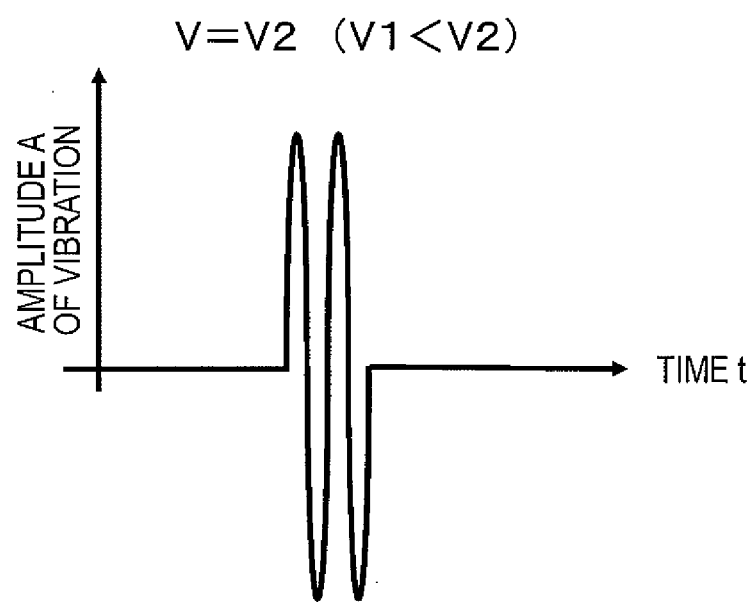
FIG. 13B is a diagram showing an example of a vibration pattern of the vibrating section in a touch operation according to an embodiment.

With reference to FIGS. 12A through 13B, an operation under Touch Operation Example 3 will be described. FIG. 12A to FIG. 12C are diagrams showing states of operation under Touch Operation Example 3. FIG. 13A and FIG. 13B are diagrams showing vibration patterns of the vibrating section 13 under Touch Operation Example 3. In accordance with the moving velocity of the touch position when the touch position reaches the boundary 12a between the inside and the outside of the display area 12, the vibration control section 33 varies the vibration amplitude of the vibrating section 13. For example, a greater vibration amplitude may be adopted when the moving velocity is fast than when the moving velocity is slow.

FIG. 12A illustrates displayed information 50e being displayed in the display area 12, where the user is touching on the outside of the display area 12 with a finger. FIG. 12B illustrates the user as having slid his or her finger at a velocity V1 in the direction of an arrow 100c. The displayed information 50e moves in a manner of being launched in the direction of the arrow 100c. FIG. 12C illustrates the user as having slid his or her finger at a velocity V2 in the direction of the arrow 100c from the state of FIG. 12A. The displayed information 50e moves in a manner of being launched in the direction of the arrow 100c. The velocity V1 and the velocity V2 are of the relationship V1<V2, so that the displayed information 50e moves faster in FIG. 12C than in FIG. 12B. In FIGS. 12B and 12C, when the finger exceeds the boundary 12a of the display area 12, the vibrating section 13 vibrates so that the vibration is felt to the user's finger. FIG. 13A shows the vibration pattern at the velocity V1, and FIG. 13B shows the vibration pattern at the velocity V2. As shown in FIGS. 13A and 13B, the amplitude A of vibration is greater at velocity V2 than at velocity V1. The user feels a stronger vibration at velocity V2 than at velocity V1.

In the above operation, the touch panel 11 is vibrated so that the user undergoing an operation of quickly flicking the displayed information 50e is allowed to feel a commensurately strong tactile sensation, thus experiencing a realistic feel of operation.

Even given the same finger-sliding velocity, the intensity of vibration may be varied depending on the content of the displayed information 50e. For example, if the displayed information 50e is a representation of a large, heavy, and rugged piece, such as a "rock", the vibration may be made strong, whereas the vibration may be made weak for a small and light piece of information, such as a "pebble", whereby the user can also experience a realistic feel of operation.

Although a method of varying the amplitude A is described above as a manner of varying the intensity of the vibration, this method is not a limitation. Various vibration patterns may be employed that are based on vibration frequency, vibration time, and so on.

First Example of Vibration Presentation, Under Touch Operation Example 4

Figure 14A:
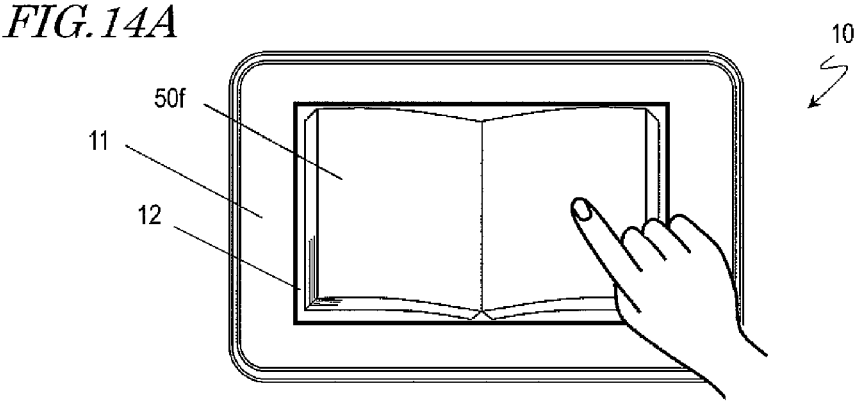
FIG. 14A is a diagram showing a state of operation in a touch operation according to an embodiment.
Figure 14B:
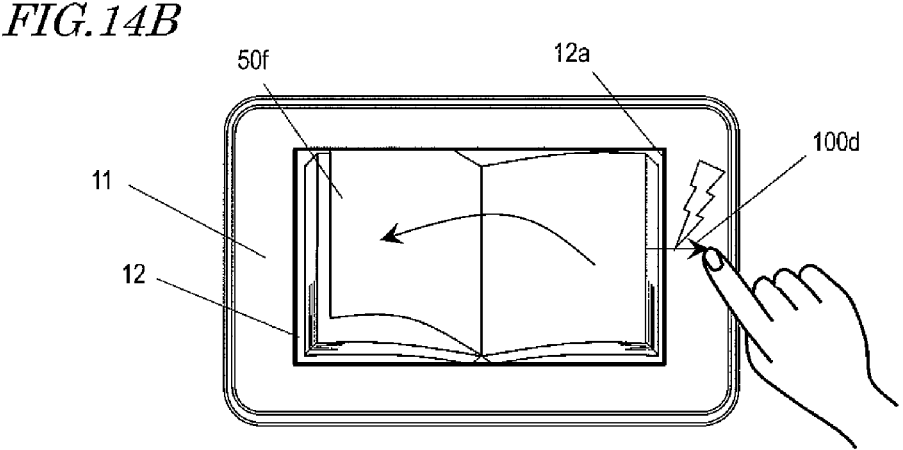
FIG. 14B is a diagram showing a state of operation in a touch operation according to an embodiment.
Figure 14C:
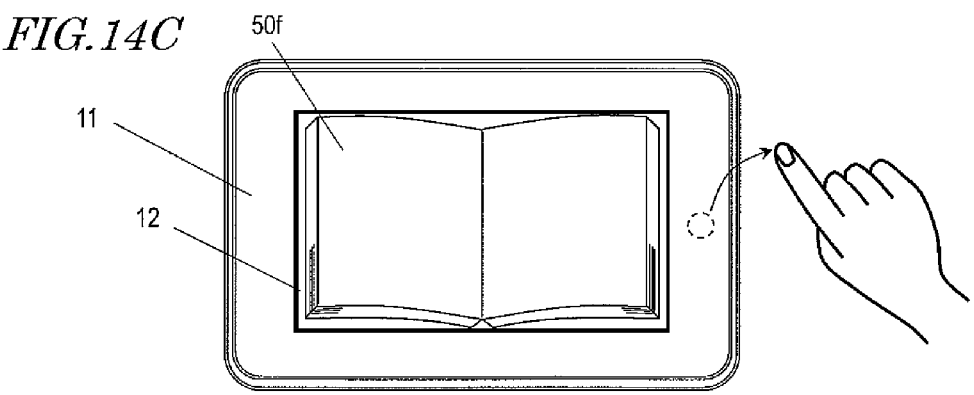
FIG. 14C is a diagram showing a state of operation in a touch operation according to an embodiment.

With reference to FIGS. 14A through 15, an operation according to a first example of vibration presentation under Touch Operation Example 4 will be described. FIGS. 14A to 14C are diagrams showing states of operation under Touch Operation Example 4. FIG. 15 is a time chart of the first example of vibration presentation under Touch Operation Example 4, showing a relationship between touch input time, touch position displacement, the vibrating section 13, and timing of switching displayed information 50f.

FIG. 14A illustrates displayed information 50f being displayed in the display area 12, where the user is touching the displayed information 50f with a finger. The displayed information 50f is a representation of an open book. FIG. 14B illustrates the user as having slid his or her finger in the direction of an arrow 100d from the inside of the display area 12 toward the boundary 12a of the display area 12. At this time, the displayed information 50f is forwarded by one page. FIG. 14C illustrates completion of page-forwarding of the displayed information 50f, the user's finger having been lifted off the touch panel 11.

In FIG. 15, an operation timing diagram 400 represents touch input time, where ON indicates any time when the touch panel 11 is touched by the user and OFF indicates any time when the touch panel 11 is not touched by the user. As shown in FIG. 14A, an operation timing diagram 401 represents touch position displacement, where a base point (0) defines a place at which the user first touches the touch panel 11; X defines a distance traveled in the direction of the arrow 100d; and X0 defines a position at which the user's finger meets the boundary 12a of the display area 12. An operation timing diagram 402 of the vibrating section 13 indicates whether the vibrating section 13 is vibrating to cause vibration of the touch panel 11 or not. A timing diagram 403 of switching of the displayed information 50f indicates whether page-forwarding of the displayed information 50f is to be performed or not.

In FIGS. 14A to 14C, a touch operation according to the present embodiment results in the following operation when a user touches the touch panel 11 with a finger.

At time 410, the user touches the touch panel 11. As the user moves the finger with an essentially constant velocity in the direction of the arrow 100d to finally exceed the boundary 12a of the display area 12, the vibrating section 13 generates a pulsed vibration at time 411, as shown in FIG. 7, this vibration being transmitted to the user's finger via the touch panel 11. Moreover, at time 411, switching of the displayed information 50f is automatically carried out, so that the page is forwarded by one from right to left. At time 412, the user lifts the finger off the touch panel 11, whereby a new page of displayed information 50f is displayed in the display area 12, as shown in FIG. 14C.

In the above operation, since the touch panel 11 is vibrated, in an operation of flipping through the pages of a book, the user is allowed to feel that one page has been certainly flipped.

Second Example of Vibration Presentation, Under Touch Operation Example 4

With reference to FIGS. 14A to 14C and FIG. 16, an operation according to a second example of vibration presentation under Touch Operation Example 4 will be described. FIG. 16 is a time chart of the second example of vibration presentation under Touch Operation Example 4, showing a relationship between touch input time, touch position displacement, the vibrating section 13, and timing of switching the displayed information 50f. When the touch position exceeds the boundary 12a between the inside and the outside of the display area 12, the vibration control section 33 generates pulsed vibrations in the vibrating section 13 in accordance with amount of displacement of the touch position from the boundary 12a. Moreover, in accordance with the timing of generating such pulsed vibrations, the display control section 32 sequentially switches the content displayed in the display area 12.

In FIG. 16, an operation timing diagram 500 represents touch input time, where ON indicates any time when the touch panel 11 is touched by the user and OFF indicates any time when the touch panel 11 is not touched by the user. As shown in FIG. 14A, an operation timing diagram 501 represents touch position displacement, where a base point (0) defines a place at which the user first touches the touch panel 11; X defines a distance traveled in the direction of the arrow 100d; and X0 defines a position at which the user's finger meets the boundary 12a of the display area 12. An operation timing diagram 502 of the vibrating section 13 indicates whether the vibrating section 13 is vibrating to cause vibration of the touch panel 11 or not. A timing diagram 503 of switching of the displayed information 50f indicates whether page-forwarding of the displayed information 50f is to be performed or not.

In FIGS. 14A to 14C, a touch operation according to the present embodiment results in the following operation when a user touches the touch panel 11 with a finger.

At time 510, the user touches the touch panel 11. As the user moves the finger with an essentially constant velocity in the direction of the arrow 100d to finally exceed the boundary 12a of the display area 12, the vibrating section 13 generates a pulsed vibration at time 511, as shown in FIG. 7. Thereafter, in proportion to the amount of movement of the user's finger, the vibrating section 13 generates pulsed vibrations at predetermined intervals. Moreover, in accordance with the timing of the vibrating section 13 generating the vibrations, the displayed information 50f is switched in a manner of forwarding the pages one by one. At time 512, as the user lifts the finger off the touch panel 11, the vibration and page-forwarding are stopped, and as shown in FIG. 14C, a new page of displayed information 50f is displayed in the display area 12.

In the above operation, since the touch panel 11 is vibrated, the user is allowed to feel each forwarding of a page during an operation of flipping through the pages of a book, in accordance with the amount of movement of the finger.

Third Example of Vibration Presentation, Under Touch Operation Example 4

With reference to FIGS. 14A through 14C, FIG. 17, and FIG. 18, an operation according to a third example of vibration presentation under Touch Operation Example 4 will be described. FIGS. 17 and 18 are time charts of the third example of vibration presentation under Touch Operation Example 4, showing a relationship between touch input time, touch position displacement, the vibrating section 13, and timing of switching the displayed information 50f. After the touch position exceeds the boundary 12a between the inside and the outside of the display area 12, the vibration control section 33 periodically causes the vibrating section 13 to generate vibrations until there is no more touching on the touch panel 11. Moreover, the display control section 32 sequentially switches the content displayed in the display area 12 in accordance with the timing of generating such periodic vibrations.

In FIG. 17, an operation timing diagram 600 represents touch input time, where ON indicates any time when the touch panel 11 is touched by the user and OFF indicates any time when the touch panel 11 is not touched by the user. As shown in FIG. 14A, an operation timing diagram 601 represents touch position displacement, where a base point (0) defines a place at which the user first touches the touch panel 11; X defines a distance traveled in the direction of the arrow 100d; and X0 defines a position at which the user's finger meets the boundary 12a of the display area 12. An operation timing diagram 602 of the vibrating section 13 indicates whether the vibrating section 13 is vibrating to cause vibration of the touch panel 11 or not. A timing diagram 603 of switching of the displayed information 50f indicates whether page-forwarding of the displayed information 50f is to be performed or not.

In FIG. 17, a touch operation according to the present embodiment results in the following operation when a user touches the touch panel 11 with a finger.

At time 610, the user touches the touch panel 11. As the user moves the finger with an essentially constant velocity in the direction of the arrow 100d, the finger reaches the boundary 12a of the display area 12 at time 611, and after exceeding the boundary 12a, the user stops the finger move at time 612. At time 612, the vibrating section generates a pulsed vibration as shown in FIG. 7. Thereafter, while the user's finger is touching, the vibrating section 13 periodically generates pulsed vibrations at predetermined intervals. Moreover, in accordance with the timing of the vibrating section 13 generating the vibrations, the displayed information 50f is switched in a manner of forwarding the pages one by one. At time 613, as the user lifts the finger off the touch panel 11, the vibration and page-forwarding are stopped, and as shown in FIG. 14C, a new page of displayed information 50f is displayed in the display area 12.

Note that, in accordance with the moving velocity of the touch position when the touch position reaches the boundary 12a, the vibration control section 33 may vary the cycle with which the vibrations are generated. For example, the vibration control section 33 may ensure that vibrations are generated with a quicker cycle when the moving velocity is fast than when the moving velocity is slow. FIG. 18 shows a time chart when the user rapidly slides the finger. Since the constitution is identical to that of FIG. 17, the same numerals will be employed, with any detailed descriptions being prevented from repetition.

At time 610 in FIG. 18, the user touches the touch panel 11. As the user moves the finger in the direction of the arrow 100d at a faster velocity than in FIG. 17, the finger reaches the boundary 12a of the display area 12 at time 611, and after the boundary 12a is exceeded, the user stops the finger move at time 612. At time 612, the vibrating section 13 generates a pulsed vibration as shown in FIG. 7. Thereafter, while the user's finger is touching, the vibrating section 13 periodically generates pulsed vibrations at predetermined intervals. The cycle of the vibrations in this case is quicker than in FIG. 17. In accordance with the timing of the vibrating section 13 generating the vibrations, the displayed information 50f is switched in a manner of forwarding the pages one by one. At time 613, as the user lifts the finger off the touch panel 11, the vibration and page-forwarding are stopped, and as shown in FIG. 14C, a new page of displayed information 50f is displayed in the display area 12. Based on the touch position displacement before and after time 611 of reaching the boundary of the display area 12, the moving velocity of the finger is calculated, and the cycle of vibrations is changed in accordance with the calculated moving velocity.

In the above operation, since the touch panel 11 is vibrated, in an operation in which the user flips through a number of pages in a book, the user is not required to slide the finger each time a new page is to be flipped. Thus the operation is easy, and the number of pages that have been forwarded is known by the number of vibrations. Moreover, page-forwarding can be performed through an intuitive operation where the finger is to be slid more quickly to forward the pages more quickly. Moreover, the operation of sliding the finger from the inside to the outside of the display area 12 can reduce the likelihood of the display area 12 becoming soiled with fingerprints near its center.

In the page flipping of a book described in Touch Operation Example 4, it is illustrated that the switching of displayed information occurs at the same timing as the vibration of the vibrating section 13, it is not necessary that the vibration and the switching of displayed information occur at the same timing; one of them may be delayed relative to the other.

Example Vibration Presentation, Under Touch Operation Example 5

Figure 19A:
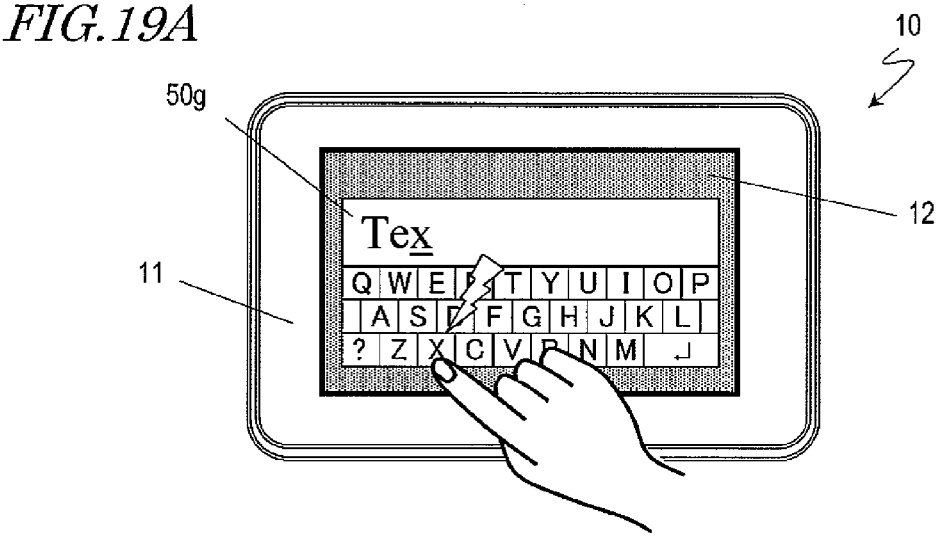
FIG. 19A is a diagram showing a state of operation in a touch operation according to an embodiment.
Figure 19B:
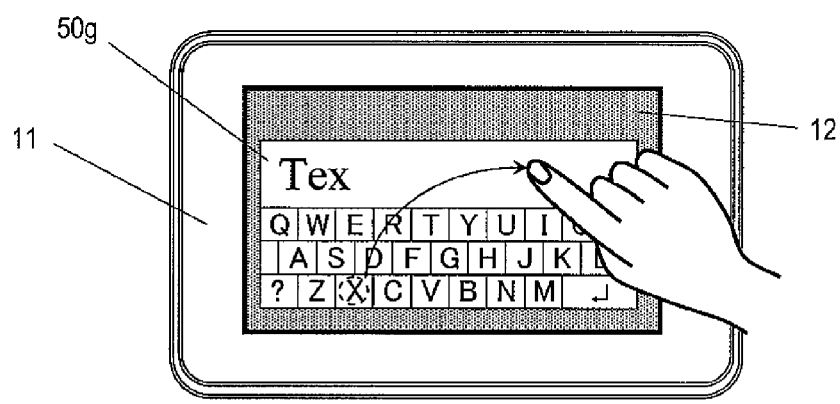
FIG. 19B is a diagram showing a state of operation in a touch operation according to an embodiment.
Figure 19C:
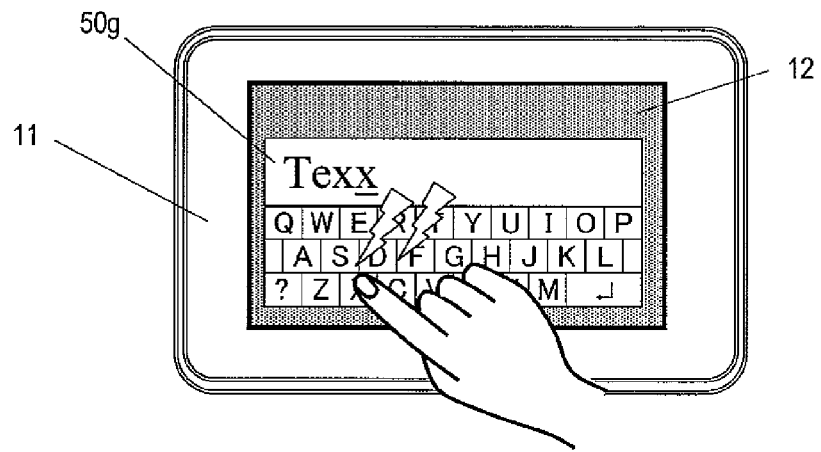
FIG. 19C is a diagram showing a state of operation in a touch operation according to an embodiment.
Figure 20A:
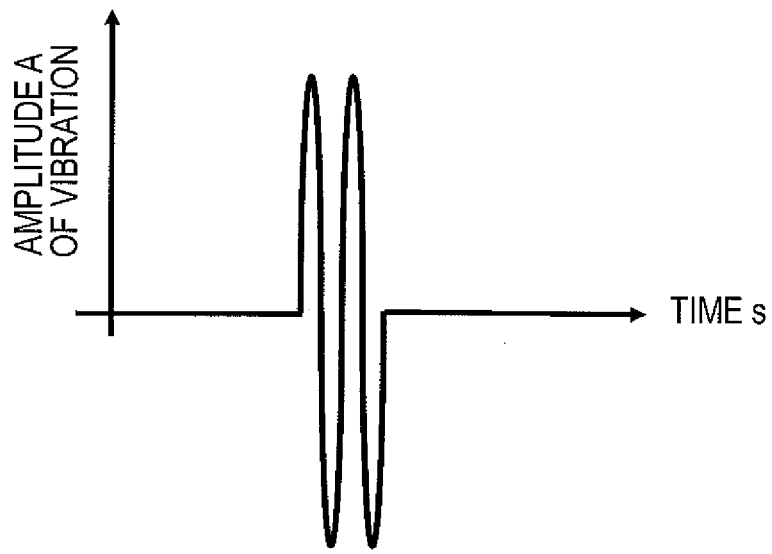
FIG. 20A is a diagram showing an example of a vibration pattern of the vibrating section in a touch operation according to an embodiment.
Figure 20B:
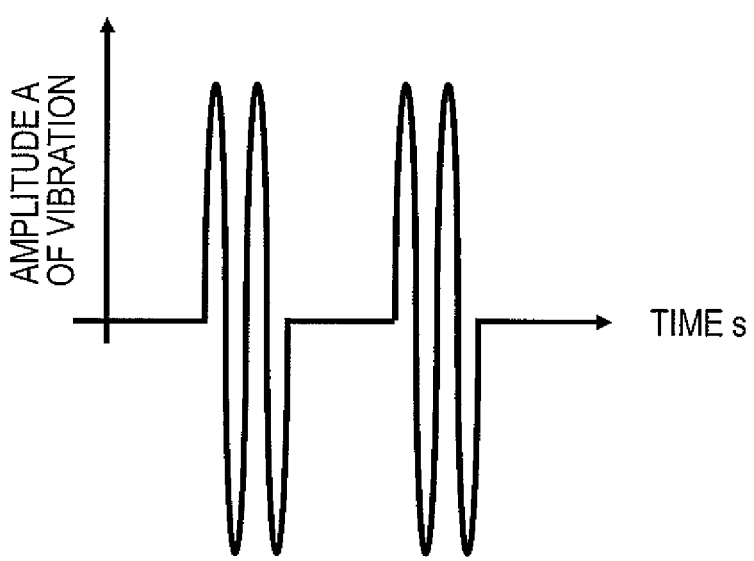
FIG. 20B is a diagram showing an example of a vibration pattern of the vibrating section in a touch operation according to an embodiment.

With reference to FIG. 19A through FIG. 20B, an operation according to an example of vibration presentation under Touch Operation Example 5 will be described. FIGS. 19A to 19C are diagrams showing states of operation under Touch Operation Example 5. FIGS. 20A and 20B show examples of vibration patterns of the vibrating section 13 under Touch Operation Example 5. When the user touches a predetermined area of the touch panel 11, the vibration control section 33 causes the vibrating section 13 to generate a first vibration. After the touch on the predetermined area ceases, if the user again touches the same predetermined area within a predetermined time, the vibration control section 33 causes the vibrating section 13 to generate a second vibration which is different from the first vibration. The predetermined area is an area corresponding to a predetermined key on a keyboard which is displayed in the display area 12, so that a character corresponding to the predetermined key is input when the user touches the predetermined area. The predetermined time may be 1 second, for example.

In FIG. 19A, displayed information 50g which is displayed in the display area 12 represents a keyboard, and the user is touching the touch panel 11 at the position of the "x" key with a finger. FIG. 19B illustrates that the user has lifted the finger off the touch panel 11, so that the input of "x" is finalized. FIG. 19C illustrates that the user is again touching the touch panel 11 at the position of the "x" key with the finger. When the user touches the "x" key as shown in FIG. 19A, the vibration control section 33 causes the vibrating section 13 to generate a pulsed vibration as shown in FIG. 20A. After the finger is lifted off, if the user touches the "x" key for a second time as shown in FIG. 19C, then the vibration control section 33 causes the vibrating section 13 to generate two pulsed vibrations as shown in FIG. 20B.

Through vibration generation according to the above operation, when the same key is successively touched twice in making keyboard inputs, the user feels different tactile sensations at the first touch and the second touch, which allows the user to surely recognize there being made two inputs in succession. Whether it was intentional or unintentional that the user has touched the same key twice in succession, the user is allowed to recognize the two successive touches having been made, which provides for a reliable touch inputting.

Even when three or more touch inputs of the same key have successively been made, the vibrating section 13 may employ a different vibration pattern for each touch input, thus allowing the user to surely recognize the multiple key inputs having been made. The above describes key inputting using the displayed information 50g which is displayed in the display area 12; however, even when the same position outside the display area 12 is successively touched, by changing the vibration pattern for each touch, the user is allowed to recognize the multiple touch inputs having been made.

Other Embodiments

In the above, one embodiment has been described as an example of the technique disclosed in the present application. However, the technique of the present disclosure is not limited thereto, but is also applicable to other embodiments in which changes, substitutions, additions, omissions, etc., are made as necessary. Different ones of the elements described in the above embodiment may be combined together to obtain a new embodiment.

Other embodiments will be illustrated hereinbelow.

Figure 21:
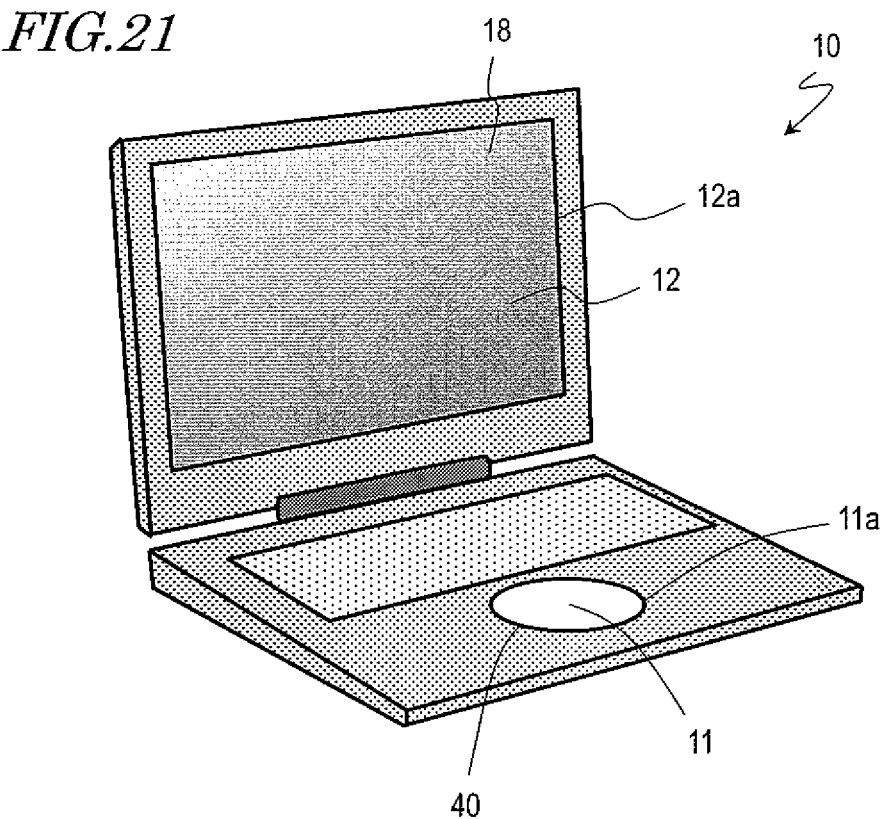
FIG. 21 is an external perspective view of an electronic device according to an embodiment.

Although the above-described embodiment illustrates the touch panel 11 being provided on the display surface side of the display panel 18 as an operating device, the touch panel 11 may be provided separately from the display panel 18, or provided in an electronic device other than any electronic device that is equipped with the display panel 18. FIG. 21 shows a laptop computer-type electronic device, as an example electronic device 10. In this example, the touch panel 11 and the display panel 18 are provided in separate housings. As the user keeps touching the touch panel 11, if the touch position moves beyond a boundary 11a between the inside and the outside of an operable region 40 of the touch panel 11, the vibration control section 33 changes the vibration of the vibrating section 13. As a method of detecting a move exceeding the boundary 11a, for example, the timing at which the touch position having been moved from the inside toward the outer periphery of the operable region 40 passes the outermost periphery of the operable region 40, such that touch becomes no longer detectable, may determined as the timing of exceeding the boundary 11a. The changes that are illustrated in the above-described embodiment, which are made in the vibration and the displayed content when the touch position exceeds the boundary 12a of the display area 12, are also to be effected when the touch position exceeds the boundary 11a. As a result, a realistic feel of operation which is in accordance with the touch operation can be presented to the user.

Although the above-described embodiment illustrates an example where there is one display panel 18 that defines the boundary of the display area 12, a plurality of display panels 18 may be incorporated. By controlling the vibration of the vibrating section 13 when the user exceeds the boundary between any two adjacent display panels with a touch of his or her finger, a realistic tactile sensation may be presented to the user.

Although the above-described embodiment illustrates that a control section is provided for controlling each component element, the present disclosure is not limited thereto. Any of various control sections, such as the touch panel control section 31, the display control section 32, and the vibration control section 33, may be implemented by the microcomputer 20.

Although the above-described embodiment is directed to a tablet-type electronic device, the electronic device 10 is not limited thereto. For example, the electronic device may be any electronic device including the touch panel, such as a mobile phone, a PDA, a game machine, a car navigation system, an ATM, etc.

The frequency, voltage, and number of cycles of the vibration patterns given in the above-described embodiment are merely illustrative, and these may be a different waveform such as a rectangular wave or sawtooth wave, an intermittent waveform, or a waveform whose frequency or amplitude changes continuously.

Although the above-described embodiment illustrate the touch panel 11 of an electrostatic type, any touch panel such as a resistive type, an optical type, an ultrasonic type, or an electromagnetic type, may be used. Furthermore, without being limited to touch operation with the user's finger, an input method by means of a stylus or a pen is also applicable.

Although the above-described embodiment illustrates an example where the vibrating section 13 vibrates when the finger touching the touch panel 11 exceeds the boundary 12a of the display area 12, vibration may be begun before the boundary 12a is exceeded, and the vibration pattern may be changed once the boundary 12a is exceeded.

Although a tactile sensation is presented by generating vibration in the above-described embodiment, the present disclosure is not limited thereto. Other than vibration, tactile sensations may be presented by other methods, e.g., as a variation of friction associated with static electricity, a skin stimulation with an electric current, and a variation of the screen shape using liquid. In addition to presenting a tactile sensation, screen display, sounds, light, heat, etc., may be used in combination as necessary.

Note that the operation of the electronic device described above may be implemented by means of hardware or software. A computer program implementing such a control operation is stored, for example, in an internal memory of the microcomputer 20. Such a computer program may be installed onto the electronic device 10 from a storage medium (an optical disc, a semiconductor memory, etc.) on which the computer program is recorded, or may be downloaded via a telecommunication lines such as the Internet.

(Summary)

As described above, an electronic device 10 according to an embodiment includes: a display panel 18 for displaying information in a display area 12, a touch panel 11 to be touched by a user, a vibrating section 13 for vibrating the touch panel 11, and a vibration control section 33 for controlling the vibration of the vibrating section 13. While the user keeps touching the touch panel 11, if the touched position is moved between the inside and the outside of the display area 12, the vibration control section 33 changes the vibration. As a result, the user can clearly confirm page-forwarding of the displayed information 50 and the like, for example.

Moreover, an electronic device 10 according to an embodiment may further include a display control section 32 for controlling displaying by the display panel 18. When the touch position is moved between the inside and the outside of the display area 12, the display control section 32 may changed content displayed on the display panel 18.

Moreover, an electronic device 10 according to an embodiment may further include a display control section 32 for controlling displaying by the display panel 18. In accordance with a move of the touch position, the display control section 32 may move the displayed position of the information in the display area 12, and the display control section 32 may ensure that the direction of the move of the displayed position of the information is varied between before and after the touch position exceeds the boundary 12a between the inside and the outside of the display area 12.

In an electronic device 10 according to an embodiment the vibration control section 33 may vary the amplitude of the vibration in accordance with the moving velocity of the touch position when the touch position reaches the boundary 12a between the inside and the outside of the display area 12. For example, the vibration control section 33 may allot a greater amplitude to the vibration when the moving velocity is fast than when the moving velocity is slow. As a result of this, the user undergoing an operation of quickly flicking the displayed information 50, for example, is allowed to feel a commensurately strong tactile sensation, thus experiencing a realistic feel of operation.

An electronic device 10 according to an embodiment may further include a display control section 32 for controlling displaying by the display panel 18. When the touch position exceeds the boundary 12a between the inside and the outside of the display area 12, the vibration control section 33 may cause the vibrating section 13 to generate a pulsed vibration in accordance with the displacement of the touch position from the boundary 12a, and the display control section 32 may sequentially switch the content displayed in the display panel 18 at the timing of generating the pulsed vibration. As a result, the user can surely feel a switching of the displayed information 50, for example.

An electronic device 10 according to an embodiment may further include a display control section 32 for controlling displaying by the display panel 18. Alternatively, after the touch position exceeds the boundary 12a between the inside and the outside of the display area 12, the vibration control section 33 may periodically cause the vibrating section 13 to generate vibrations until there is no more touching on the touch panel 11, and the display control section 32 may sequentially switch the content displayed on the display panel 18 in accordance with the timing of generating such periodic vibrations. As a result, the user can perform switching of the displayed information 50 through an intuitive operation, in a reliable and easy manner, for example. Moreover, in accordance with the moving velocity of the touch position when the touch position reaches the boundary 12a, the vibration control section 33 may vary the cycle with which the vibrations are generated. Moreover, the vibration control section 33 may ensure that vibrations are generated with a quicker cycle when the moving velocity is fast than when the moving velocity is slow.

In an electronic device 10 according to an embodiment, when the touch position moves from the inside of the display area 12 to the outside of the display area 12, the vibration control section 33 may generate a vibration. As a result, in an operation of sliding a finger from the inside toward the outside of the display area 12, for example, a realistic feel of operation is realized, and the likelihood of the center of the display area 12 becoming soiled with fingerprints is reduced.

In an electronic device 10 according to an embodiment, a touch position detection area of the touch panel 11 may have a geometric area which is greater than the display area 12.

In an electronic device 10 according to an embodiment, when the user touches a first area of the touch panel 11, the vibration control section 33 may cause the vibrating section 13 to generate a first vibration, and after the touch on the first area ceases, if the user again touches the first area within a predetermined time, the vibration control section 33 may cause the vibrating section 13 to generate a second vibration different from the first vibration. As a result, the user can surely recognize two successive touch inputs having been made, for example.

Alternatively, an electronic device 10 according to an embodiment includes a touch panel 11 to be touched by a user, a vibrating section 13 for vibrating the touch panel 11, and a vibration control section 33 for controlling the vibration of the vibrating section 13. While the user keeps touching the touch panel 11, if the position of touching moves between the inside and the outside of a touch position detection area of the touch panel 11, the vibration control section 33 changes the vibration. As a result, even in a constitution where the display panel 18 and the touch panel are independent of each other, the user can clearly confirm page-forwarding of the displayed information 50 and the like, for example.

Alternatively, an electronic device 10 according to an embodiment includes a display panel 18 for displaying information, a touch panel 11 to be touched by a user, a vibrating section 13 for vibrating the touch panel 11, and a vibration control section 33 for controlling the vibration of the vibrating section 13. When the user touches a first area of the touch panel 11, the vibration control section 33 causes the vibrating section 13 to generate a first vibration. After the touch on the first area ceases, if the user again touches the first area within a predetermined time, the vibration control section 33 causes the vibrating section 13 to generate a second vibration different from the first vibration. The first area is an area corresponding to a predetermined key on a keyboard displayed on the display panel 18, for example, and when the user touches the first area, a character corresponding to the predetermined key is input. As a result, the user can surely recognize two successive touch inputs having been made, for example.

A computer program according to an embodiment causes the electronic device 10 to perform a vibration operation. The computer program causes a microcomputer 20 of the electronic device 10 to execute: a step of displaying information in the display area 12; a step of detecting a touch operation of the user on the touch panel 11; and a step of, if the touched position is moved between the inside and the outside of the display area 12 while the user keeps touching the touch panel 11, changing the vibration of the touch panel 11. As a result, the user can clearly confirm page-forwarding of the displayed information 50 and the like, for example.

A computer program according to an embodiment causes a microcomputer 20 of the electronic device 10 to execute: a step of detecting a touch operation of the user on the touch panel 11; a step of, if the position of touching moves between the inside and the outside of a touch position detection area of the touch panel 11 while the user keeps touching the touch panel 11, changing the vibration of the touch panel 11. As a result, the user can clearly confirm page-forwarding of the displayed information 50 and the like, for example.

A computer program according to an embodiment causes a microcomputer 20 of the electronic device 10 to execute: a step of detecting a touch operation of the user on the touch panel 11; a step of causing the touch panel 11 to generate a first vibration when the user touches a first area of the touch panel 11; and a step of generating a second vibration different from the first vibration on the touch panel 11 if the user again touches the first area within a predetermined time after the touch on the first area ceases. As a result, the user can surely recognize two successive touch inputs having been made, for example.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, substitutions, additions, omissions, etc., can be made without departing from the scope defined by the claims and the equivalents thereof.

The present disclosure is useful for electronic devices which permit touch operation by a user, for example.

This application is based on Japanese Patent Applications No. 2012-037106 filed on Feb. 23, 2012 and No. 2013-004367 filed on Jan. 15, 2013, the entire contents of which are hereby incorporated by reference.

What is claimed is:

1. An electronic device comprising:
a display that displays information in a display area;
a panel to be touched by a user;
a vibrator that vibrates the panel;
a vibration controller that controls the vibration of the vibrator; and
a display controller that controls displaying by the display wherein,
if a touch position on the panel touched by the user moves across a boundary between an inside of the display area in which information is displayable and an outside of the display area in which information is not displayable, and then the move of the touch position stops while the user keeps touching the panel, the vibration controller causes the vibrator to generate a pulsed vibration in accordance with an amount of displacement of the stop position from the boundary, and at a timing of generating each pulsed vibration, the display controller changes a content displayed by the display, wherein the inside of the display area and the outside of the display area as touched by the user are on the same plane.

2. The electronic device of claim 1, wherein the vibration controller varies an amplitude of the vibration in accordance with a moving velocity of the touch position when the touch position reaches the boundary between the inside and the outside of the display area.

3. The electronic device of claim 2, wherein the vibration controller allots a greater amplitude to the vibration when the moving velocity is fast than when the moving velocity is slow.

4. The electronic device of claim 1, wherein,
the vibration controller causes the vibrator to periodically generate vibrations until there is no more touching on the panel, and
at a timing of generating each periodic vibration, the display controller changes the content displayed by the display.

5. The electronic device of claim 4, wherein, in accordance with a moving velocity of the touch position when the touch position reaches the boundary, the vibration controller varies a cycle with which the vibrations are generated.

6. The electronic device of claim 5, wherein the vibration controller adopts a greater cycle of generating the vibrations when the moving velocity is fast than when the moving velocity is slow.

7. The electronic device of claim 1, wherein a touch position detection area of the panel has a geometric area which is greater than the display area.

\* \* \* \* \*